US012763008B2

(12) United States Patent
Lin et al.

(10) Patent No.: US 12,763,008 B2
(45) Date of Patent: Oct. 13, 2026

(54) PIXEL ARRAY SUBSTRATE AND DRIVING METHOD THEREOF

(71) Applicant: AUO Corporation, Hsinchu City (TW)

(72) Inventors: Cheng-Hsing Lin, Hsinchu City (TW); Jui-Chi Lo, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/234,302

(22) Filed: Jun. 11, 2025

(65) Prior Publication Data

US 2026/0179533 A1 Jun. 25, 2026

(30) Foreign Application Priority Data

Dec. 23, 2024 (TW) ................................ 113150167

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2300/0426* (2013.01); *G09G 2300/0465* (2013.01); *G09G 2300/0819* (2013.01); *G09G 2310/061* (2013.01); *G09G 2310/08* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 10,424,603 | B2 | 9/2019 | Lee et al. | |
| 10,796,631 | B2 * | 10/2020 | Hung | G09G 3/3233 |
| 11,217,143 | B2 * | 1/2022 | Lin | G09G 3/20 |
| 11,610,533 | B2 | 3/2023 | Chang et al. | |
| 11,978,373 | B1 * | 5/2024 | Huang | G09G 3/3233 |
| 2019/0252411 | A1 * | 8/2019 | Lee | H10D 86/411 |
| 2022/0114947 | A1 * | 4/2022 | Chang | G09G 3/30 |
| 2023/0351958 | A1 * | 11/2023 | Liu | G09G 3/3233 |
| 2024/0013714 | A1 * | 1/2024 | Zhang | G09G 3/3208 |

FOREIGN PATENT DOCUMENTS

| | | | | |
|---|---|---|---|---|
| CN | 106647066 | | 5/2017 | |
| CN | 117095630 A | * | 11/2023 | G09G 3/30 |
| TW | I728723 | | 5/2021 | |

* cited by examiner

*Primary Examiner* — Kenneth Bukowski
(74) *Attorney, Agent, or Firm* — JCIPRNET

(57) ABSTRACT

A pixel array substrate includes pixel circuits, data lines, a first reset control signal line, and a first light-emitting control signal line. Each pixel circuit includes a reset circuit, a writing circuit, a light-emitting control circuit, and a light-emitting diode. The data lines are extended along a first direction and electrically connected to the pixel circuits. The first reset control signal line is extended along the first direction and electrically connected to the reset circuits of a first plurality of pixel circuits. The first plurality of the pixel circuits are arranged in two or more rows along the first direction. The first light-emitting control signal line is extended along the first direction and electrically connected to the light-emitting control circuits of the first plurality of the pixel circuits.

14 Claims, 12 Drawing Sheets

PIXEL ARRAY SUBSTRATE AND DRIVING METHOD THEREOF

CROSS-REFERENCE TO RELATED APPLICATION

This application claims the priority benefit of Taiwan application serial no. 113150167, filed on Dec. 23, 2024. The entirety of the above-mentioned patent application is hereby incorporated by reference herein and made a part of this specification.

BACKGROUND OF THE INVENTION

Field of the Invention

The invention relates to a pixel array substrate and a driving method thereof.

Description of Related Art

As display technology advances, the size of pixels continues to shrink and the pixels are distributed in display panels with higher density. However, this trend has also brought about a sharp increase in the number of signal lines, resulting in an increase in the proportion of signal lines in the pixel structure, further compressing the effective light-emitting area and significantly limiting the aperture ratio.

Dense arrangement of signal lines reduces display brightness and efficiency. This issue is particularly prominent in high-resolution display applications. How to increase pixel density while reducing the impact of signal lines on aperture ratio has become one of the main design challenges.

SUMMARY OF THE INVENTION

The invention provides a pixel array substrate and a driving method thereof. The pixel array substrate may improve the aperture ratio of the pixel array substrate by reducing the number of signal lines in the pixel array substrate.

At least one embodiment of the invention provides a pixel array substrate, including a plurality of pixel circuits, a plurality of data lines, a first reset control signal line, and a first light-emitting control signal line. Each of the pixel circuits includes a reset circuit, a writing circuit, a light-emitting control circuit, and a light-emitting diode. The writing circuit is electrically connected to the reset circuit. The light-emitting control circuit is electrically connected to the writing circuit. The light-emitting diode is electrically connected to the light-emitting control circuit. The data lines are extended along a first direction and electrically connected to the pixel circuits. The first reset control signal line is extended along the first direction and electrically connected to the reset circuits of a first plurality of pixel circuits. The first plurality of the pixel circuits are arranged in two or more rows along the first direction. The first light-emitting control signal line is extended along the first direction and electrically connected to the light-emitting control circuits of the first plurality of the pixel circuits.

At least one embodiment of the invention provides a driving method of a pixel array substrate, including following steps. The above pixel array substrate is provided, and the pixel array substrate further includes a second reset control signal line and a second light-emitting control signal line. The second reset control signal line is extended along the first direction and electrically connected to the reset circuits of a second plurality of the pixel circuits, wherein the second plurality of the pixel circuits are arranged in other two or more rows along the first direction. The second light-emitting control signal line is extended along the first direction and electrically connected to the light-emitting control circuits of the second plurality of the pixel circuits. A first reset signal is provided to the first plurality of the pixel circuits using the first reset control signal line. A plurality of writing signals are provided to the first plurality of the pixel circuits sequentially. A first light-emitting signal is provided to the first plurality of the pixel circuits using the first light-emitting control signal line. A second reset signal is provided to the second plurality of the pixel circuits using the second reset control signal line. Another plurality of writing signals are provided to the second plurality of the pixel circuits sequentially. A second light-emitting signal is provided to the second plurality of the pixel circuits using the second light-emitting control signal line.

At least one embodiment of the invention provides a pixel array substrate, including a plurality of switch elements, a plurality of driving elements, a plurality of transistors, a plurality of data lines, a plurality of scan lines, a plurality of gate lines, a plurality of gate signal lines, and a plurality of light-emitting diodes. Each of the driving elements is electrically connected to one corresponding switch element. The data lines are extended along a first direction and electrically connected to the switch elements. The scan lines are extended along a second direction and electrically connected to the switch elements. The second direction is not parallel to the first direction. The gate lines are extended along the second direction and electrically connected to the transistors. The gate signal lines are extended along the first direction, and each of the gate signal lines is electrically connected to corresponding two or more of the gate lines. The light-emitting diodes are electrically connected to the driving elements respectively.

DESCRIPTION OF THE EMBODIMENTS

Figure 1:
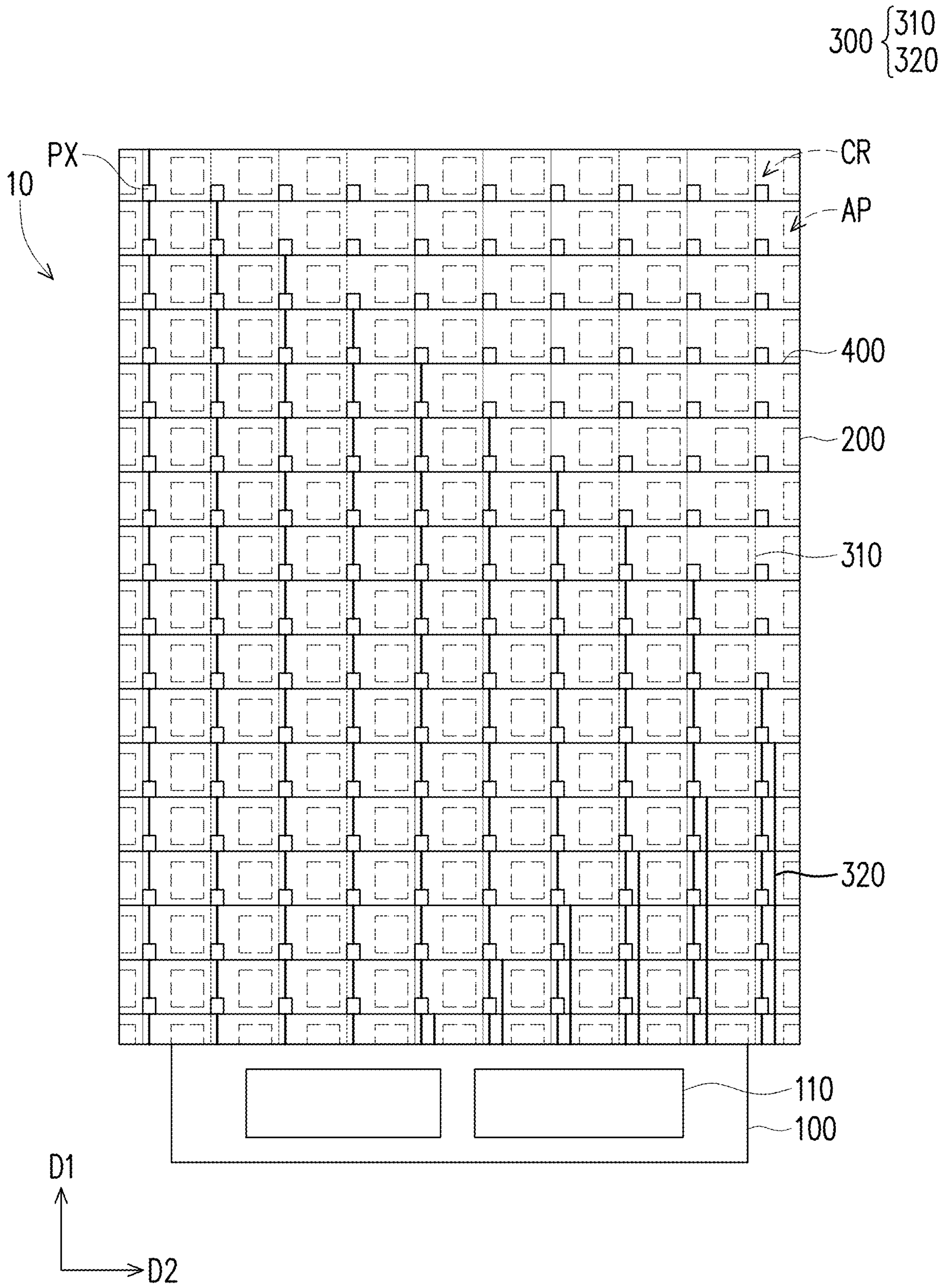
FIG. 1 is a top schematic view of a pixel array substrate according to an embodiment of the invention.

FIG. 1 is a top schematic view of a pixel array substrate 10 according to an embodiment of the invention. Referring to FIG. 1, the pixel array substrate 10 includes a circuit board 100 and a display panel 200.

Figure 2:
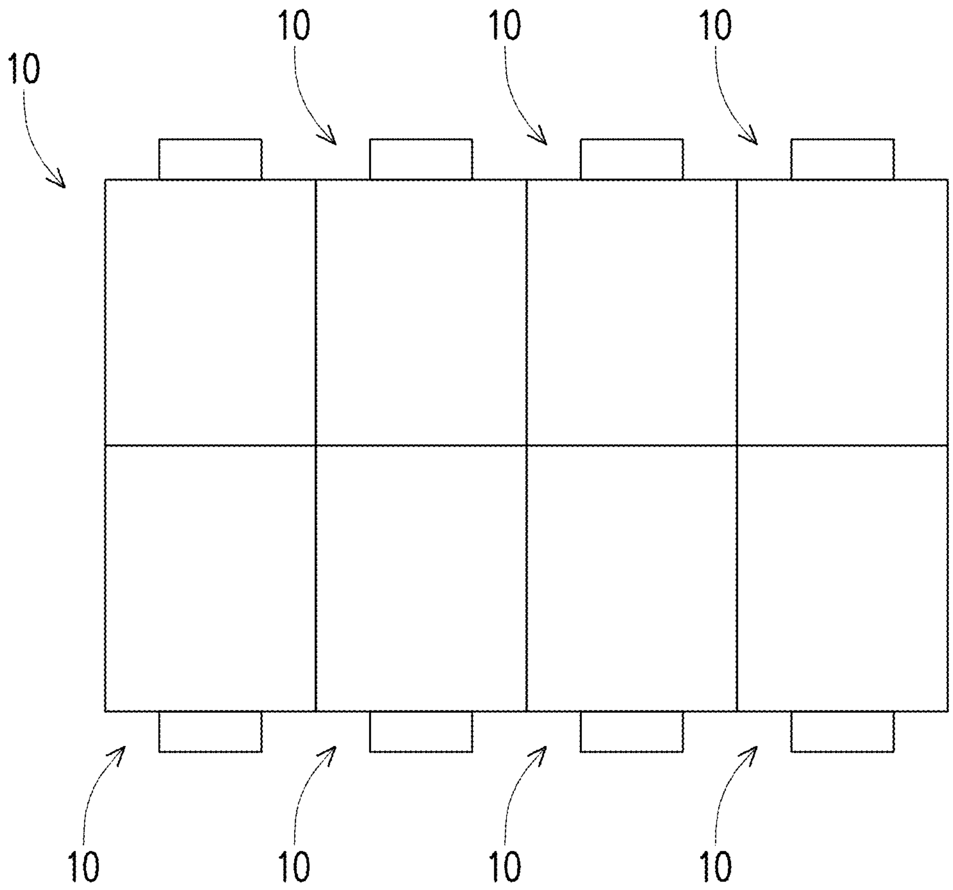
FIG. 2 is a top schematic view of a tiled display device according to an embodiment of the invention.

A plurality of chips 110 are disposed on the circuit board 100, and the chips 110 are electrically connected to the display panel 200 via the circuit board 100. In the present embodiment, since the circuit board 100 is only disposed at a side of the display panel 200, the other three sides of the display panel 200 may be tiled together with the display panels 200 of other pixel array substrates 10 to form a tiled display device, as shown in FIG. 2.

The display panel 200 includes pixel structures PX arranged in an array and signal lines connected to the pixel structures PX. In the present embodiment, the display panel 200 has an opening area AP and a circuit layout area CR surrounding the opening area AP. In some embodiments, a light-shielding structure (such as a black matrix) is disposed at the circuit layout area CR and is used to shield the signal lines and the pixel structures PX. In the present embodiment, the signal lines in the pixel array substrate 10 include a plurality of vertical signal lines 300 and a plurality of horizontal signal lines 400. In some embodiments, the display panel 200 is a transparent display panel, and the opening area AP may also be referred to as a transmission area.

The vertical signal lines 300 are extended along a first direction D1 and include a plurality of first transmission lines 310 and a plurality of second transmission lines 320. In some embodiments, each of the first transmission lines 310 is electrically connected to pixel circuits in a plurality of pixel structures PX arranged in a column in the first direction D1. For example, the first transmission lines 310 include a data line, a reference voltage signal line, an initial voltage signal line, a test voltage signal line, or other signal lines.

In some embodiments, the chips 110 are electrically connected to the vertical signal lines 300 via the circuit board 100. In other words, the chips 110 are configured to provide signals to the vertical signal lines 300. In the present embodiment, the circuit board 100 is only disposed at a side of the display panel 200, so that the vertical signal lines 300 may only receive signals from a single side (i.e., a side of the display panel 200 where the circuit board 100 is disposed), but the invention is not limited thereto. In other embodiments, the circuit board 100 is disposed at the upper and lower sides of the display panel 200, so that the vertical signal lines 300 may receive signals from the upper and lower sides. For example, a portion of the vertical signal lines 300 receives signals from the upper side, and another portion of the vertical signal lines 300 receives signals from the lower side. In this way, different vertical signal lines 300 may be separated in the first direction D1 and connected to the circuit boards 100 at the upper and lower sides respectively.

The horizontal signal lines 400 are extended along a second direction D2. Each of the second transmission lines 320 is electrically connected to at least one corresponding horizontal signal line 400 and electrically connected to pixel circuits in a plurality of pixel structures PX arranged in a row in the second direction D2 via the at least one corresponding horizontal signal line 400. For example, the second transmission lines 320 include gate signal lines (e.g., including reset control signal lines and light-emitting control signal lines) and writing control signal lines, and the horizontal signal lines 400 include gate lines (e.g., including reset signal lines and light-emitting signal lines) and scan lines. Each of the gate signal lines is electrically connected to two or more gate lines and electrically connected to transistors (such as reset transistors or light-emitting control transistors) in pixel circuits in two or more rows of pixel structures PX via the two or more gate lines. Each of the writing control signal lines is electrically connected to a scan line and electrically connected to a switch element in a pixel circuit in a row of pixel structures PX via the scan line.

It should be noted that the number and the distribution positions of the vertical signal lines 300 and the horizontal signal lines 400 in FIG. 1 are only for illustration, and the number and the distribution positions of the vertical signal lines 300 and the horizontal signal lines 400 may be adjusted according to needs.

Figure 3:
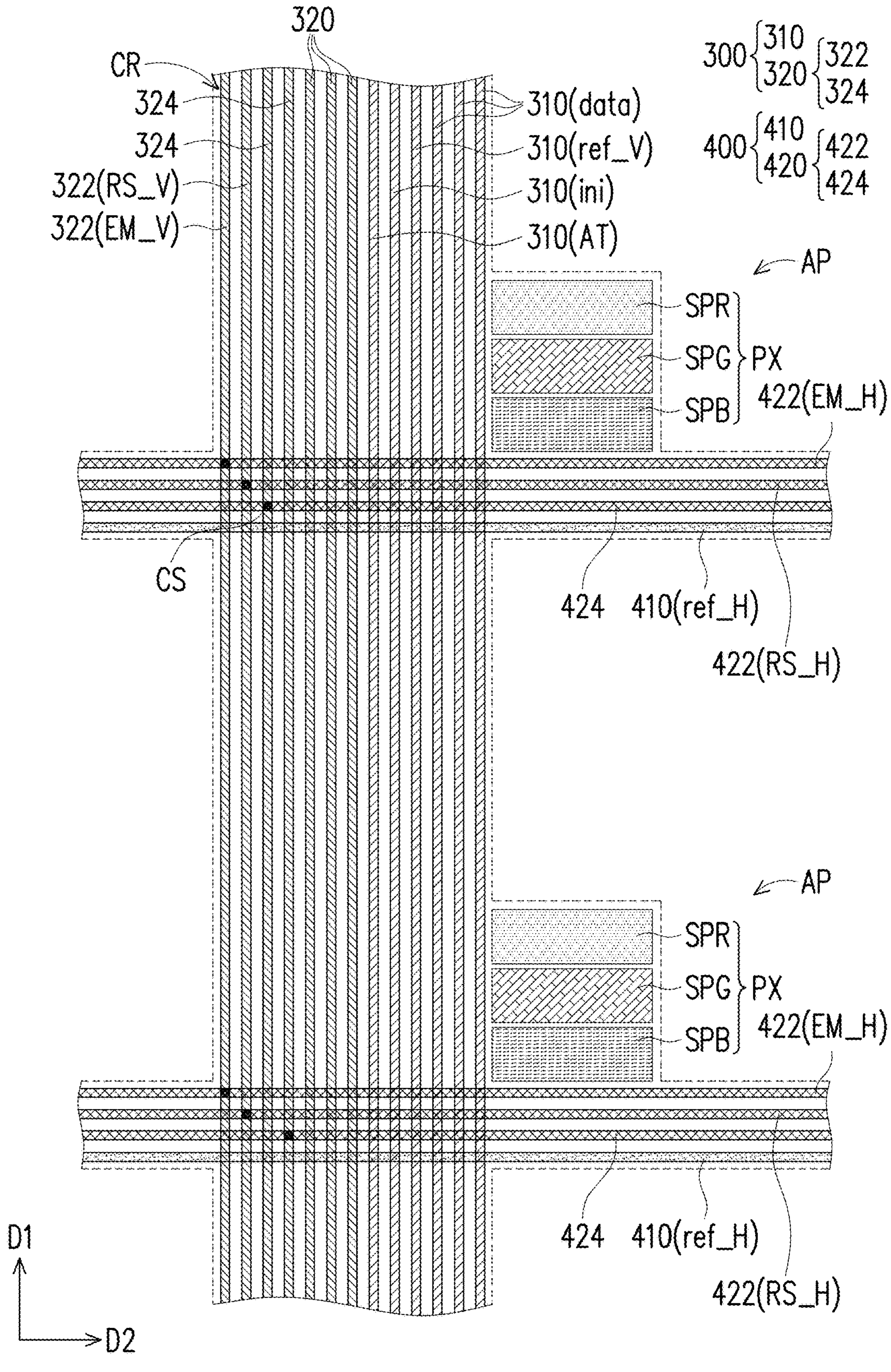
FIG. 3 is a partial top schematic view of a pixel array substrate according to an embodiment of the invention.

FIG. 3 is a partial top schematic view of a pixel array substrate according to an embodiment of the invention. Specifically, FIG. 3 shows two pixel structures PX of the pixel array substrate and signal lines located around the two pixel structures PX of the pixel array substrate. Referring to FIG. 3, three pixel circuits SPR, SPG, and SPB form one pixel structure PX. In some embodiments, the pixel circuits SPR, SPG, SPB are respectively a red pixel circuit, a green pixel circuit, and a blue pixel circuit to achieve a color display function. However, the invention is not limited thereto. In other embodiments, the pixel array substrate is suitable for a monochrome display device, and one pixel structure only includes a pixel circuit of a single color, and the number of pixel circuits in a single pixel structure PX may be adjusted according to demand. In addition, the arrangement of the pixel circuits SPR, SPG, SPB may be adjusted according to requirements.

The vertical signal lines 300 include a first transmission line 310 and a second transmission line 320. The first transmission line 310, for example, includes a data line data extending along the first direction D1, a vertical reference voltage signal line ref_V, an initial voltage signal line ini, and a test voltage signal line AT. The second transmission line 320, for example, includes a gate signal line 322 and a writing control signal line 324 extended along the first direction D1. The gate signal line 322 includes a reset control signal line RS_V and a light-emitting control signal line EM_V.

The horizontal signal lines 400 include a voltage signal line 410 and a signal output line 420. The voltage signal line 410, for example, includes a horizontal reference voltage signal line ref_H extended along the second direction D2. The signal output line 420 includes, for example, a gate line 422 and a scan line 424 extended along the second direction D2. The gate line 422 includes a reset signal line RS_H and a light-emitting signal line EM_H.

In some embodiments, the same gate signal line 322 is electrically connected to corresponding two or more of the gate lines 422. For example, one reset control signal line RS_V is electrically connected to two or more reset signal lines RS_H, and one light-emitting control signal line EM_V is electrically connected to two or more light-emitting signal lines EM_H. Moreover, in some embodiments, each of the writing control signal lines 324 is electrically connected to a corresponding scan line 424.

In some embodiments, the vertical signal lines 300 and the horizontal signal lines 400 are respectively located at different conductive film layers, and there is an insulating layer (not shown) between the different conductive film layers. The vertical signal lines 300 and the horizontal signal lines 400 are electrically connected via a conductive structure CS, wherein the conductive structure CS passes through the above insulating layer.

In some embodiments, a plurality of pixel structures PX (only one of which is shown in FIG. 3) arranged in a row in the second direction D2 are electrically connected to the same reference voltage signal line ref_H, the same reset signal line RS_H, the same light-emitting signal line EM_H, and the same scan line 424. More specifically, a plurality of pixel circuits SPR (only one of which is shown in FIG. 3), a plurality of pixel circuits SPG (only one of which is shown in FIG. 3), and/or a plurality of pixel circuits SPB (only one of which is shown in FIG. 3) arranged in the same row of pixel structures PX in the second direction D2 are electrically connected to the same reference voltage signal line ref_H, the same reset signal line RS_H, the same light-emitting signal line EM_H, and the same scan line 424.

Moreover, the pixel structures PX arranged in a column in the first direction D1 are electrically connected to the same vertical reference voltage signal line ref_V, the same initial voltage signal line ini, the same test voltage signal line AT, and the same one or plurality of data lines data. In the present embodiment, the pixel circuits SPR, SPG, and SPB are pixel circuits of different colors. Therefore, the pixel circuits SPR in the same column are electrically connected to the same data line data, the pixel circuits SPG in the same column are electrically connected to another data line data, and the pixel circuits SPB in the same column are electrically connected to yet another data line data.

In the embodiment of FIG. 3, the vertical signal lines 300 and the horizontal signal lines 400 are not included between the pixel circuits SPR, SPG, and SPB of the same pixel structure PX, but the invention is not limited thereto. In other embodiments, the vertical signal lines 300 and/or the horizontal signal lines 400 are disposed between the pixel circuits SPR, SPG, SPB of the same pixel structure PX. For example, in the embodiment of FIG. 4, the vertical signal lines 300 are disposed between the pixel circuits SPR, SPG, and SPB of the same pixel structure PX.

Based on the above, compared to connecting each of the gate signal lines 322 extended in the first direction D1 to a single gate line 422 extended in the second direction D2, in the present embodiment, the number of vertical signal lines needed may be reduced by electrically connecting each of the gate signal lines 322 to corresponding two or more of the gate lines 422, thereby improving the aperture ratio of the pixel array substrate.

Figure 4:
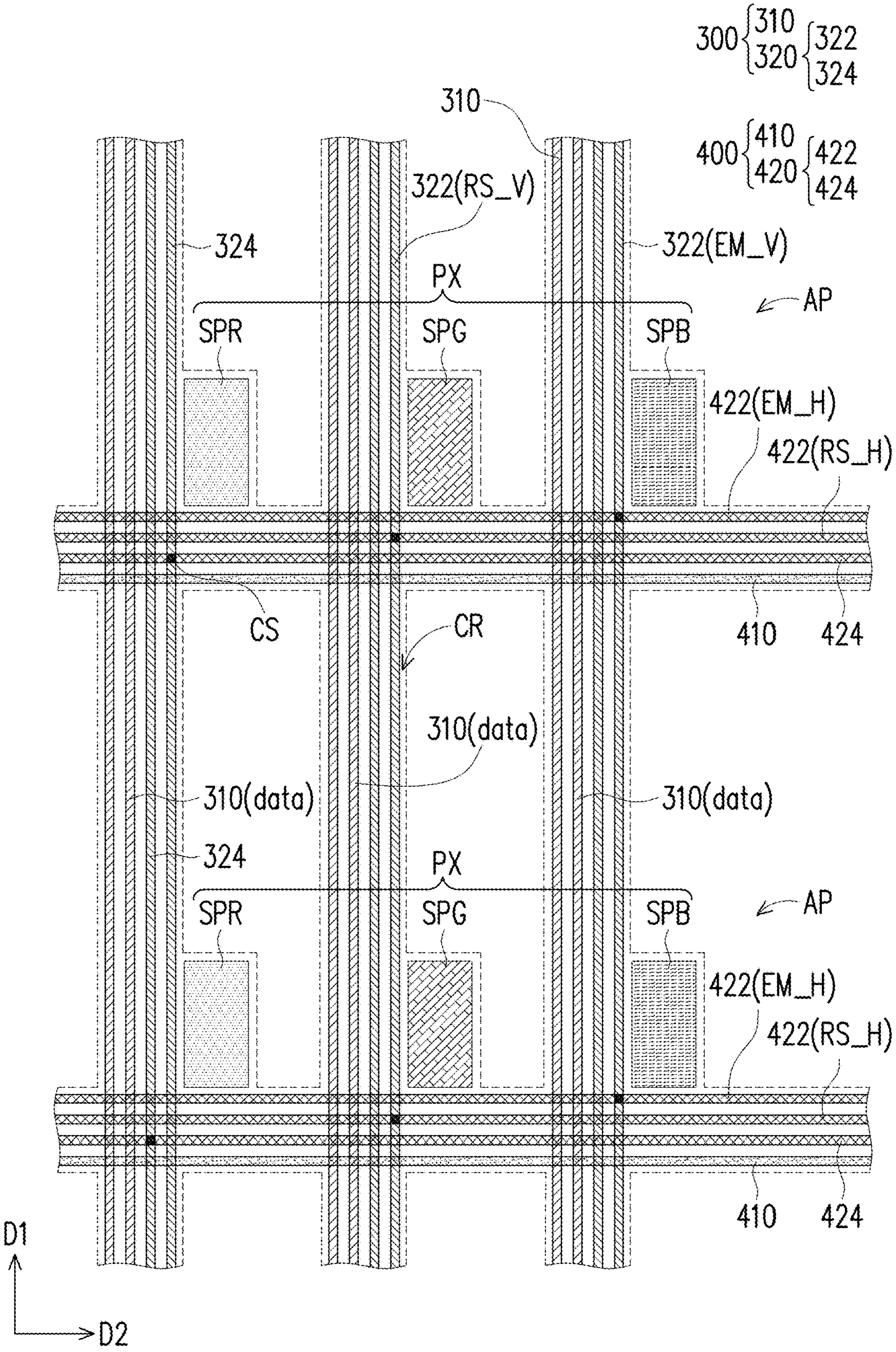
FIG. 4 is a partial top schematic view of a pixel array substrate according to an embodiment of the invention.
Figure 5:
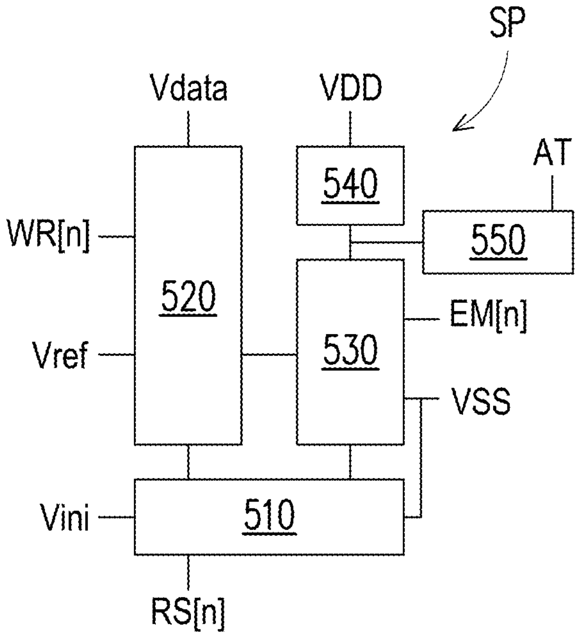
FIG. 5 is a functional block diagram of a pixel circuit according to an embodiment of the invention.

FIG. 5 is a functional block diagram of a pixel circuit SP according to an embodiment of the invention. For example, each of the pixel circuits SPR, SPG, SPB in FIG. 3 and FIG. 4 may be represented by the pixel circuit SP of FIG. 5. In FIG. 5, [n] in a reset signal RS[n], a writing signal WR[n], and a light-emitting signal EM[n] represents a signal of the n-th order, and n is a positive integer. For example, n equals 1 corresponds to a signal provided to the first row of pixel structures (refer to FIG. 1, FIG. 3, and FIG. 4, the same row of pixel structures PX and/or pixel circuits SPR, SPG, SPB arranged along the second direction D2), and n equals 2 corresponds to a signal provided to the second row of pixel structures (refer to FIG. 1, FIG. 3, and FIG. 4, another same row of pixel structures PX and/or pixel circuits SPR, SPG, SPB arranged along the second direction D2), and so on. In some embodiments, the first row of pixel structures, the second row of pixel structures, etc., may be arranged in sequence or in no sequence in the display panel 200 (refer to FIG. 1).

Referring to FIG. 5, the pixel circuit SP includes a reset circuit 510, a writing circuit 520, a light-emitting control circuit 530, and a light-emitting diode 540. In some embodiments, the pixel circuit SP may optionally include a test circuit 550.

The reset circuit 510 is configured to receive an initial signal Vini and the reset signal RS[n]. For example, the initial voltage signal line ini and the reset signal line RS_H (refer to FIG. 3 and FIG. 4) are electrically connected to the reset circuit 510 and used to provide the initial signal *Vini* and the reset signal RS[n] to the reset circuit 510, respectively. In the present embodiment, the reset circuit 510 is further configured to receive a first operating voltage signal VSS, wherein the first operating voltage signal VSS may be provided to the pixel circuit SP via the vertical signal lines 300 and/or the horizontal signal lines 400 (the signal line for providing the first operating voltage signal VSS is not separately shown in FIG. 3 and FIG. 4). In other embodiments, the reset circuit 510 does not receive the initial signal *Vini*, and the initial signal *Vini* may be omitted.

The writing circuit 520 is electrically connected to the reset circuit 510. The writing circuit 520 is configured to receive the writing signal WR[n], a reference voltage Vref, and a data line signal Vdata. For example, the data line data, the scan line 424, and the reference voltage signal line ref_V and/or the reference voltage signal line ref_H (refer to FIG. 3 and FIG. 4) are electrically connected to the writing circuit 520, wherein the data line data and the scan line 424 are respectively used to provide the data line signal Vdata and the writing signal WR[n] to the writing circuit 520, and the reference voltage signal line ref_V and/or the reference voltage signal line ref_H are used to provide the reference voltage Vref to the writing circuit 520. In other embodiments, the writing circuit 520 does not receive the reference voltage Vref, and the reference voltage Vref may be omitted.

The light-emitting control circuit 530 is electrically connected to the reset circuit 510 and the writing circuit 520. The light-emitting control circuit 530 is configured to receive the light-emitting signal EM[n]. For example, the light-emitting signal line EM_H is electrically connected to the light-emitting control circuit 530 and used to provide the light-emitting signal EM[n] to the light-emitting control circuit 530. In the present embodiment, the light-emitting control circuit 530 is further configured to receive the first operating voltage signal VSS.

The light-emitting diode 540 is electrically connected to the light-emitting control circuit 530, and the light-emitting diode 540 is turned on or off by operating the light-emitting control circuit 530. In some embodiments, the light-emitting diode 540 may be a light-emitting diode of any color. For example, when the light-emitting diode 540 is a red light-emitting diode, the pixel circuit SP may also be called a red pixel circuit (for example, the pixel circuit RSP in FIG. 3 and FIG. 4); when the light-emitting diode 540 is a green light-emitting diode, the pixel circuit SP may also be called a green pixel circuit (for example, the pixel circuit GSP in FIG. 3 and FIG. 4); when the light-emitting diode 540 is a blue light-emitting diode, the pixel circuit SP may also be called a blue pixel circuit (for example, the pixel circuit BSP in FIG. 3 and FIG. 4).

In the present embodiment, the light-emitting diode 540 is further configured to receive a second operating voltage signal VDD, wherein the second operating voltage signal VDD may be provided to the pixel circuit SP via the vertical signal lines 300 and/or the horizontal signal lines 400 (the signal line for providing the second operating voltage signal VDD is not separately shown in FIG. 3 and FIG. 4). In some embodiments, the first operating voltage signal VSS is different from the second operating voltage signal VDD, and the two may be swapped.

Referring to FIG. 3, FIG. 4, and FIG. 5, each of the reset control signal lines RS_V is electrically connected to the reset circuits 510 of corresponding plurality of the pixel circuits SP via two ore more reset signal lines RS_H, wherein the corresponding plurality of the pixel circuits SP are arranged in two or more rows extended in the second direction D2 along the first direction D1. In the case in which the pixel array substrate includes a plurality of reset control signal lines RS_V, the first reset control signal line RS_V (or the first reset control signal line) is electrically connected to the first plurality of the pixel circuits SP arranged in two or more rows, and the second reset control signal line RS_V (or the second reset control signal line) is electrically connected to the second plurality of the pixel circuits SP arranged in other two or more rows.

Moreover, each of the light-emitting control signal lines EM_V is electrically connected to the light-emitting control circuits 530 of corresponding plurality of the pixel circuits SP via two or more light-emitting signal lines EM_H, wherein the corresponding plurality of the pixel circuits SP are arranged in two or more rows extended in the second direction D2 along the first direction D1. In the case in which the pixel array substrate includes a plurality of light-emitting control signal lines EM_V, the first light-emitting control signal line EM_V (or the first light-emitting control signal line) is electrically connected to the first plurality of the pixel circuits SP arranged in two or more rows, and the second light-emitting control signal line EM_V (or the second light-emitting control signal line) is electrically connected to the second plurality of the pixel circuits SP arranged in other two or more rows.

Each of the writing control signal lines 324 is electrically connected to the writing circuit 520 of one row of pixel circuits SP via a scan line 424. For example, in the case in which the pixel array substrate includes a plurality of writing control signal lines 324, the first writing control signal lines 324 (e.g., the writing control signal lines 324 located at the upper side in FIG. 3 and FIG. 4) are electrically connected to the first row of the first plurality of the pixel circuits SP, and the second writing control signal lines 324 (e.g., the writing control signal lines 324 located at the lower side in FIG. 3 and FIG. 4) are electrically connected to the second row of the first plurality of the pixel circuits SP. The third writing control signal lines 324 (not shown in FIG. 3 and FIG. 4) are electrically connected to the first row of the second plurality of the pixel circuits SP (not shown in FIG. 3 and FIG. 4), and the fourth writing control signal lines 324 (not shown in FIG. 3 and FIG. 4) are electrically connected to the second row of the second plurality of the pixel circuits SP.

Figure 6:
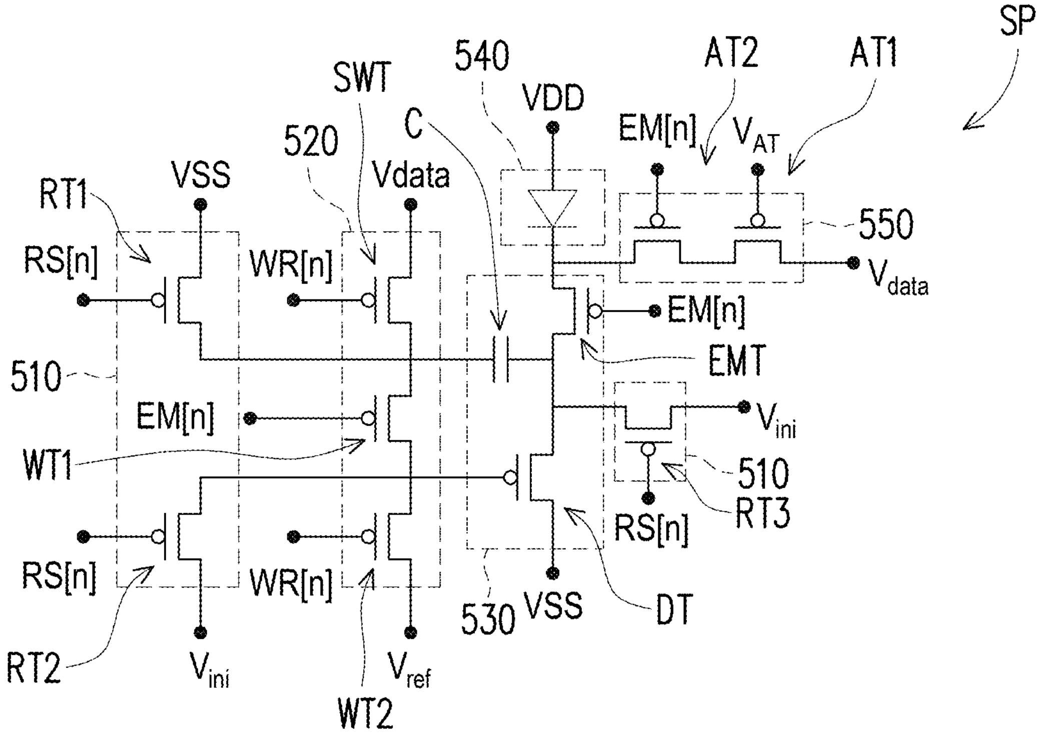
FIG. 6 is an equivalent circuit diagram of a pixel circuit according to an embodiment of the invention.

FIG. 6 is an equivalent circuit diagram of a pixel circuit SP according to an embodiment of the invention. For example, FIG. 6 is one implementation of the pixel circuit SP of FIG. 5.

Referring to FIG. 6, the reset circuit 510 includes a first reset transistor RT1, a second reset transistor RT2, and a third reset transistor RT3 for receiving the reset signal RS[n]. For example, the reset control signal line RS_V (refer to FIG. 3 and FIG. 4) is electrically connected to the gate of the first reset transistor RT1, the gate of the second reset transistor RT2, and the gate of the third reset transistor RT3 to provide the reset signal RS[n] to the first reset transistor RT1, the second reset transistor RT2, and the third reset transistor RT3. In addition, the first reset transistor RT1 is further configured to receive the first operating voltage signal VSS, and the second reset transistor RT2 and the third reset transistor RT3 are electrically connected to the initial voltage signal line ini (refer to FIG. 3 and FIG. 4) to receive the initial signal Vini.

The writing circuit 520 includes a switch element SWT, a first writing transistor WT1, and a second writing transistor WT2. The first writing transistor WT1 is connected between the second writing transistor WT2 and the switch element SWT. The switch element SWT is electrically connected to a corresponding one of the data lines data and a corresponding one of the scan lines 424 (refer to FIG. 3 and FIG. 4) to receive the data line signal Vdata and the writing signal WR[n]. The first writing transistor WT1 is electrically connected to the light-emitting control signal line EM_V (refer to FIG. 3 and FIG. 4) to receive the light-emitting signal EM[n]. The second writing transistor WT2 is electrically connected to the scan line 424 and the reference voltage signal line ref_V and/or the reference voltage signal line ref_H (refer to FIG. 3 and FIG. 4) to receive the writing signal WR[n] and the reference voltage Vref.

The light-emitting control circuit 530 includes a light-emitting control transistor EMT, a driving element DT, and a capacitor C. The light-emitting control transistor EMT is electrically connected to the light-emitting control signal line EM_V (refer to FIG. 3 and FIG. 4) to receive the light-emitting signal EM[n]. In addition, the light-emitting control transistor EMT is also electrically connected to the light-emitting diode 540, the capacitor C, the third reset transistor RT3, and the driving element DT.

The driving element DT is electrically connected to the switch element SWT. In the present embodiment, the driving element DT is electrically connected to the switch element SWT via the capacitor C, wherein one end of the capacitor C is electrically connected to the switch element SWT, the first reset transistor RT1, and the first writing transistor WT1, and another end of the capacitor C is electrically connected to the light-emitting control transistor EMT, the third reset transistor RT3, and the driving element DT. In addition, the gate of the driving element DT is electrically connected to the second reset transistor RT2, the second writing transistor WT1, and the first writing transistor WT2.

In addition, the light-emitting diode 540 is electrically connected to the driving element DT via the light-emitting control transistor EMT.

The test circuit 550 includes a first test transistor AT1 and a second test transistor AT2. The second test transistor AT2 is connected between the first test transistor AT1 and the light-emitting diode 540. The first test transistor AT1 is configured to receive the data line signal Vdata and a test voltage signal $V_{AT}$. For example, the data line data and the test voltage signal line AT (refer to FIG. 3 and FIG. 4) are electrically connected to the first test transistor AT1 to provide the data line signal Vdata and the test voltage signal $V_{AT}$ to the first test transistor AT1, respectively. The second test transistor AT2 is electrically connected to the light-emitting control signal line EM_V (refer to FIG. 3 and FIG. 4) to receive the light-emitting signal EM[n].

FIG. 6 provides an example in which the total number of transistors, switch elements, and driving elements in the pixel circuit SP is 10, and the number of capacitors is 1, but the invention is not limited thereto. In other embodiments, the pixel circuit SP may include more or fewer transistors. In other words, the invention does not limit the pixel circuit SP to a 10T1C architecture.

Figure 7A:
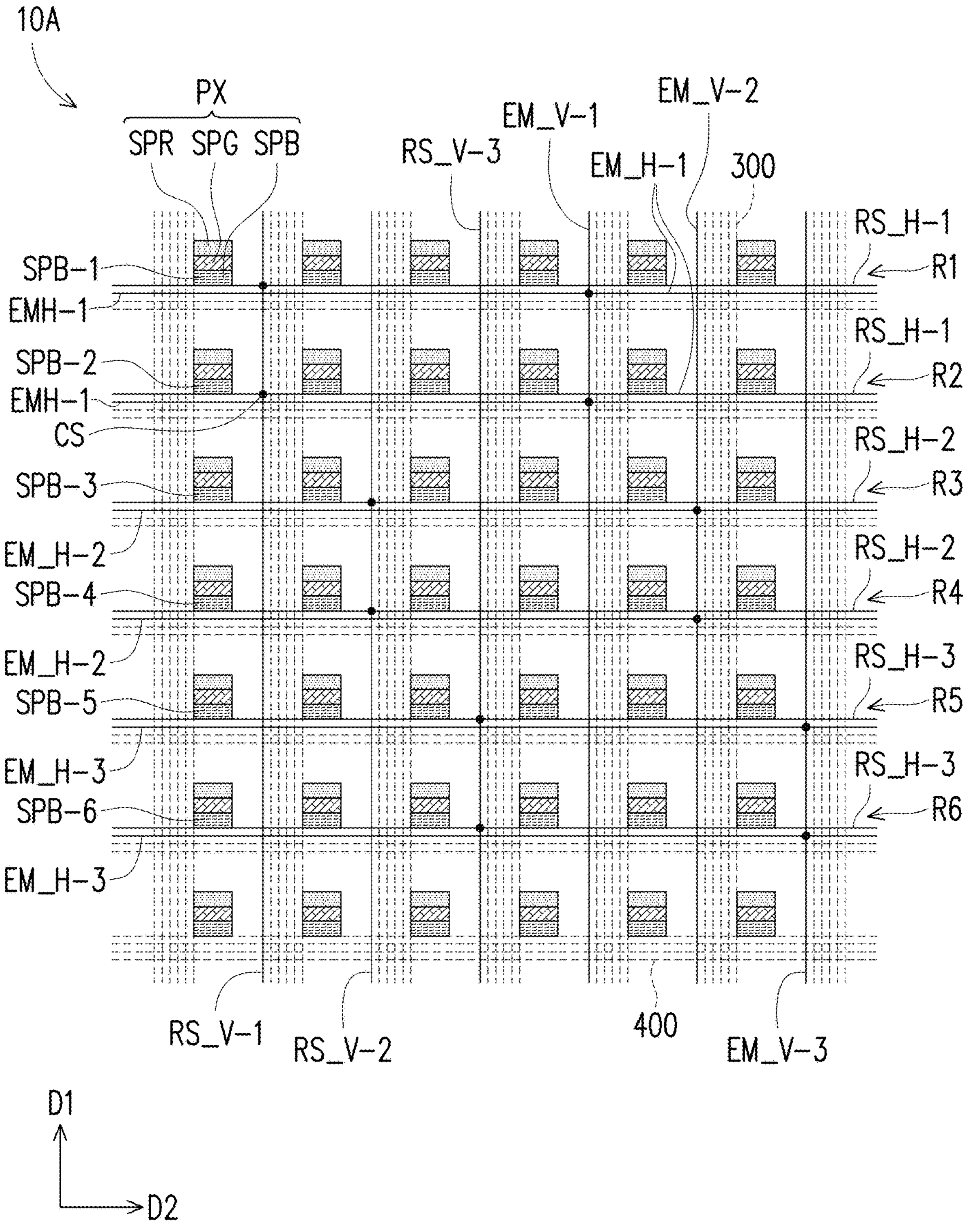
FIG. 7A is a partial top schematic view of a pixel array substrate according to an embodiment of the invention.
Figure 7B:
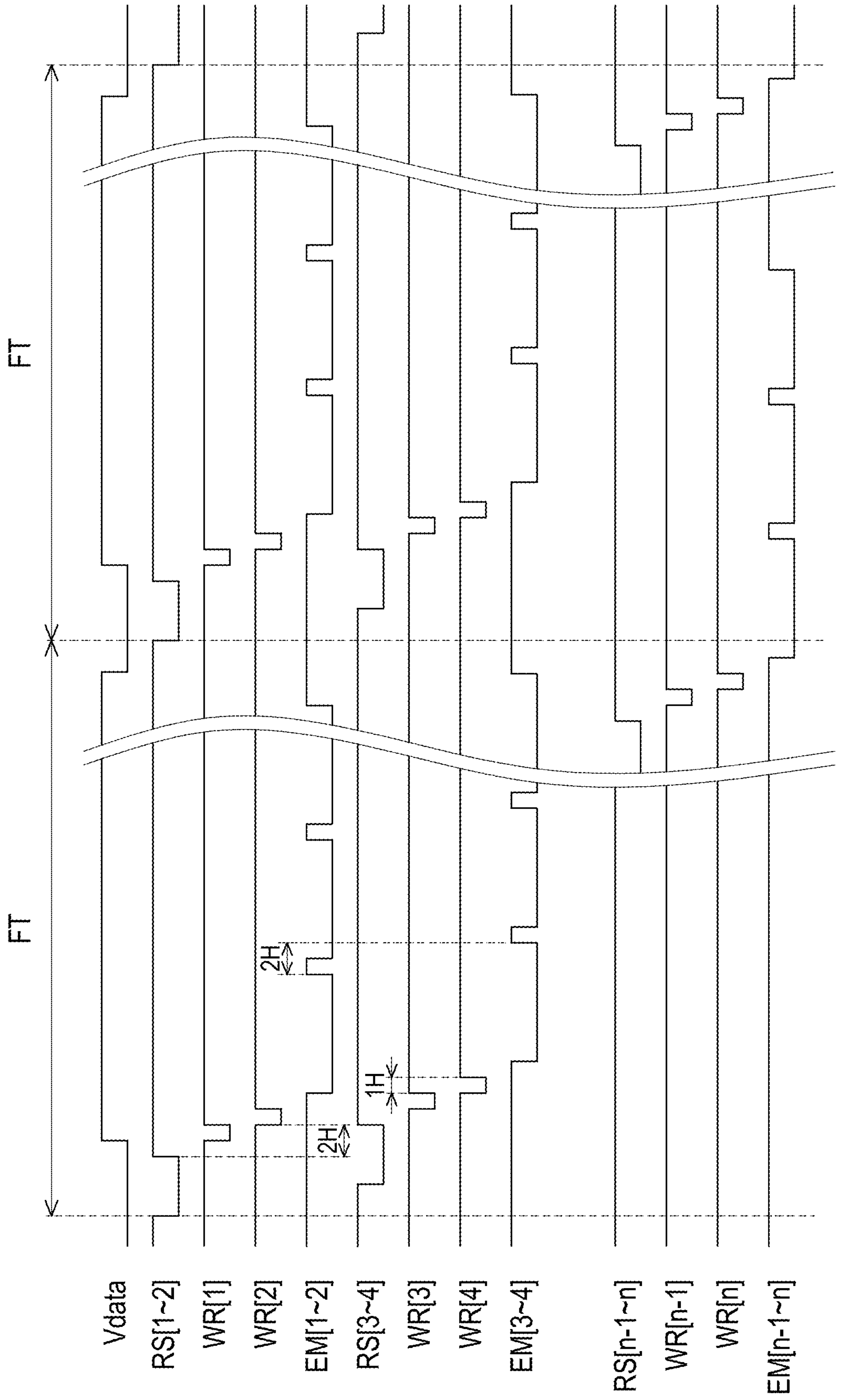
FIG. 7B is a signal timing diagram of the driving method of the pixel array substrate of FIG. 7A.

FIG. 7A is a partial top schematic view of a pixel array substrate 10A according to an embodiment of the invention. FIG. 7B is a signal timing diagram of the driving method of the pixel array substrate 10A of FIG. 7A. It should be mentioned here that, the embodiment of FIG. 7A and FIG. 7B adopts the reference numerals of any of the embodiments of FIG. 1 to FIG. 6 and a portion of the contents thereof, wherein the same or similar numerals are used to represent the same or similar elements and descriptions of the same technical contents are omitted. For descriptions of omitted portions, reference may be made to the above embodiments and are not described again here.

In FIG. 7A, in order to make the diagram clear, first to third reset control signal lines RS_V−1 to RS_V−3, first to third light-emitting control signal lines EM_V−1 to EM_V−3, first to third reset signal lines RS_H−1 to RS_H−3, and first to third light-emitting signal lines EM_H−1 to EM_H−3 that are to be described in detail are drawn with solid lines, and other vertical signal lines 300 (for example, including data lines, vertical reference voltage signal lines, initial voltage signal lines, test voltage signal lines, and writing control signal lines) and horizontal signal lines 400 (for example, including horizontal reference voltage signal lines and scan lines) are represented by dotted lines. The various signal lines shown in FIG. 7A are for illustration only, and the quantity and the position of the various signal lines may be adjusted according to actual needs.

Referring to FIG. 7A, in the present embodiment, the first reset control signal line RS_V−1 and the first light-emitting control signal line EM_V−1 are electrically connected to two first reset signal lines RS_H−1 and two first light-emitting signal lines EM_H−1, respectively, and electrically connected to the first plurality of pixel circuits SPR, SPG, SPB via the two first reset signal lines RS_H−1 and the two first light-emitting signal lines EM_H−1. In other words, a first reset control signal line RS_V−1 and a first light-emitting control signal line EM_V−1 are electrically connected to two rows of pixel circuits SPR, two rows of pixel circuits SPG, and/or two rows of pixel circuits SPB. The first plurality of pixel circuits SPR, SPG, SPB form a first row R1 and a second row R2 of pixel structures PX. For example, the first plurality of the pixel circuits SPR, SPG, SPB include a first pixel circuit SPB−1 and a second pixel circuit SPB−2 arranged along the first direction D1.

In the present embodiment, the second reset control signal line RS_V−2 and the second light-emitting control signal line EM_V−2 are electrically connected to two second reset signal lines RS_H−2 and two second light-emitting signal lines EM_H−2, respectively, and electrically connected to the second plurality of pixel circuits SPR, SPG, SPB via the two second reset signal lines RS_H−2 and the two second light-emitting signal lines EM_H−2. In other words, a second reset control signal line RS_V−2 and a second light-emitting control signal line EM_V−2 are electrically connected to two rows of pixel circuits SPR, two rows of pixel circuits SPG, and/or two rows of pixel circuits SPB. The second plurality of pixel circuits SPR, SPG, SPB form a third row R3 and a fourth row R4 of pixel structures PX. For example, the second plurality of the pixel circuits SPR, SPG, SPB include a third pixel circuit SPB−3 and a fourth pixel circuit SPB−4 arranged along the first direction D1.

In the present embodiment, the third reset control signal line RS_V−3 and the third light-emitting control signal line EM_V−3 are electrically connected to two third reset signal lines RS_H−3 and two third light-emitting signal lines EM_H−3, respectively, and electrically connected to the third plurality of pixel circuits SPR, SPG, SPB via the two third reset signal lines RS_H−3 and the two third light-emitting signal lines EM_H−3. In other words, a third reset control signal line RS_V−3 and a third light-emitting control signal line EM_V−3 are electrically connected to two rows of pixel circuits SPR, two rows of pixel circuits SPG, and/or two rows of pixel circuits SPB. The third plurality of pixel circuits SPR, SPG, SPB form a fifth row R5 and a sixth row R6 of pixel structures PX. For example, the third plurality of the pixel circuits SPR, SPG, SPB include a fifth pixel circuit SPB−5 and a sixth pixel circuit SPB−6 arranged along the first direction D1.

In the present embodiment, every two rows of pixel structures PX share the same reset control signal line and the same light-emitting control signal line. By sharing the reset control signal line and the light-emitting control signal line, the number of signal lines needed may be reduced, thereby increasing the aperture ratio of the pixel array substrate.

Referring to FIG. 7A and FIG. 7B, when driving the pixel array substrate 10A, within a time range of a frame FT, first reset signals RS[1 to 2] are first provided to the first plurality of the pixel circuits (e.g., pixel circuits in the first row R1 and the second row R2) using the first reset control signal line RS_V−1.

Next, a plurality of writing signals WR[1] and WR[2] are provided to the first plurality of the pixel circuits sequentially. For example, the writing signal WR[1] is provided to the pixel circuits in the first row R1 via the first writing control signal line, and then the writing signal WR[2] is provided to the pixel circuits in the second row R2 via the second writing control signal line. When the writing signals WR[1] and WR[2] are provided, the data line signal Vdata is provided to the pixel circuits. In some embodiments, the data line signal Vdata may include a red data line signal, a green data line signal, and a blue data line signal, and are provided to a red pixel circuit, a green pixel circuit, and a blue pixel circuit, respectively.

Next, first light-emitting signals EM[1 to 2] are provided to the first plurality of the pixel circuits (e.g., the pixel circuits in the first row R1 and the second row R2) using the first light-emitting control signal line EM_V−1.

In some embodiments, the duration of one writing signal is 1H. After a period of time (e.g., time 2H, which is twice the time 1H) after the first reset signals RS[1 to 2] are provided, second reset signals RS[3 to 4] are provided to the second plurality of the pixel circuits (e.g., pixel circuits in the third row R3 and the fourth row R4) using the second reset control signal line RS_V−2.

Next, a plurality of writing signals WR[3] and WR[4] are provided to the second plurality of the pixel circuits sequentially. For example, the writing signal WR[3] is provided to the pixel circuits in the third row R3 via the third writing control signal line, and then the writing signal WR[4] is provided to the pixel circuits in the fourth row R4 via the fourth writing control signal line. When the writing signals WR[3] and WR[4] are provided, the data line signal Vdata is provided to the pixel circuits.

Next, second light-emitting signals EM[3 to 4] are provided to the second plurality of the pixel circuits (e.g., the pixel circuits in the third row R3 and the fourth row R4) using the second light-emitting control signal line EM_V−2.

Similarly, (n/2)th reset signals RS[n−1 to n] are provided to the pixel circuits in the (n−1)th row and the n-th row using the (n/2)th reset control signal line.

Next, a writing signal WR[n−1] is provided to the pixel circuits in the (n−1)th row via the (n−1)th writing control signal line, and then the writing signal WR[n] is provided to the pixel circuits in the n-th row via the n-th writing control signal line. When the writing signals WR[n−1] and WR[n] are provided, the data line signal Vdata is provided to the pixel circuits.

Next, (n/2)th light-emitting signals EM[n−1 to n] are provided to the pixel circuits in the (n−1)th row and the n-th row using the (n/2)th light-emitting control signal line.

At this point, the operation of the pixel array substrate 10A in one frame FT is completed.

Figure 8A:
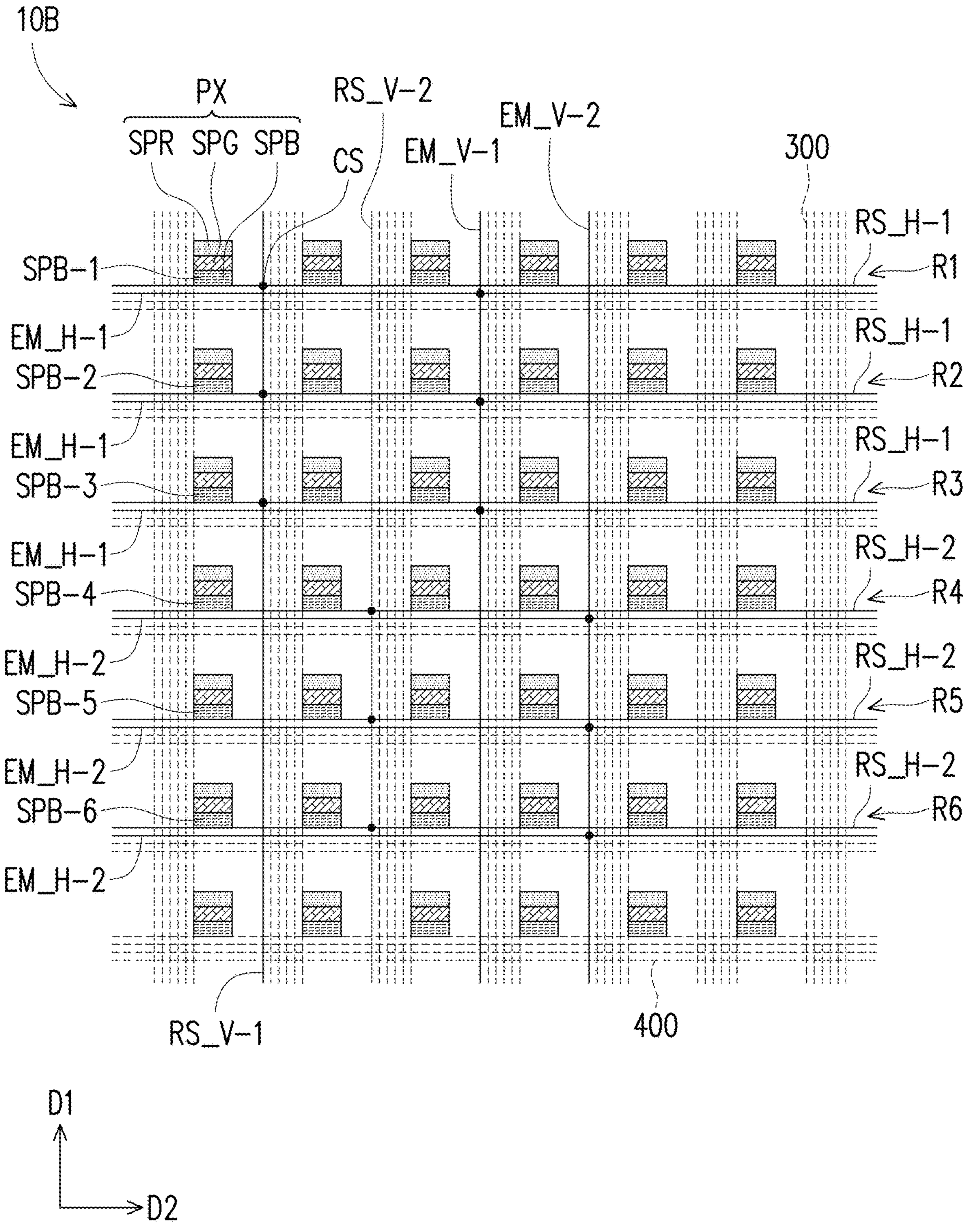
FIG. 8A is a partial top schematic view of a pixel array substrate according to an embodiment of the invention.
Figure 8B:
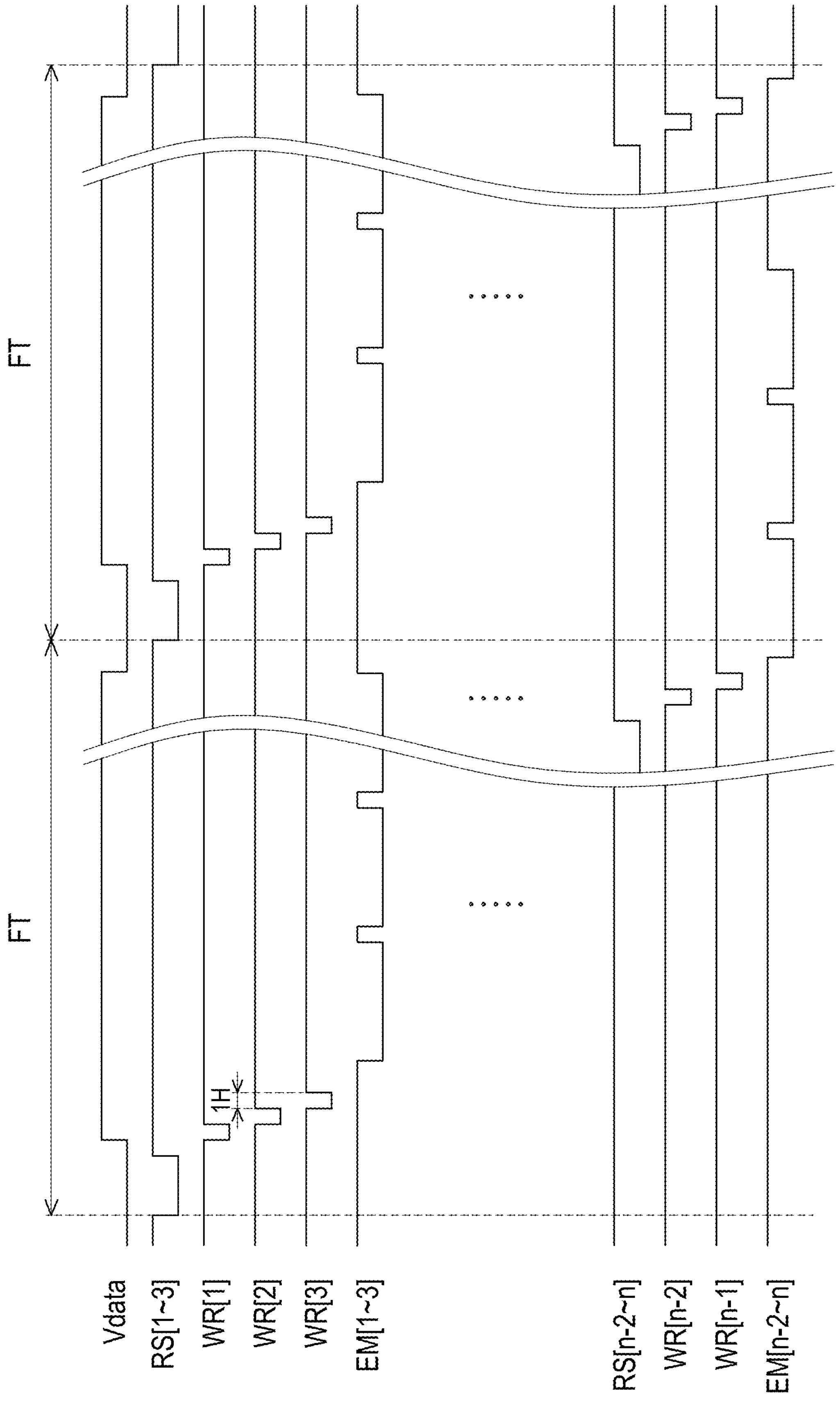
FIG. 8B is a signal timing diagram of the driving method of the pixel array substrate of FIG. 8A.

FIG. 8A is a partial top schematic view of a pixel array substrate 10B according to an embodiment of the invention. FIG. 8B is a signal timing diagram of the driving method of the pixel array substrate 10B of FIG. 8A. It should be mentioned here that, the embodiment of FIG. 8A and FIG. 8B adopts the reference numerals of the embodiment of FIG. 7A and FIG. 7B and a portion of the contents thereof, wherein the same or similar numerals are used to represent the same or similar elements and descriptions of the same technical contents are omitted. For descriptions of omitted portions, reference may be made to the above embodiments and are not described again here.

Referring to FIG. 8A, in the present embodiment, the first reset control signal line RS_V−1 and the first light-emitting control signal line EM_V−1 are electrically connected to three first reset signal lines RS_H−1 and three first light-emitting signal lines EM_H−1, respectively, and electrically connected to the first plurality of pixel circuits SPR, SPG, SPB via the three first reset signal lines RS_H−1 and the three first light-emitting signal lines EM_H−1. In other words, a first reset control signal line RS_V−1 and a first light-emitting control signal line EM_V−1 are electrically connected to three rows of pixel circuits SPR, three rows of pixel circuits SPG, and/or three rows of pixel circuits SPB. The first plurality of pixel circuits SPR, SPG, SPB form the first row R1, the second row R2, and the third row R3 of pixel structures PX. For example, the first plurality of the pixel circuits SPR, SPG, SPB include the first pixel circuit SPB−1, the second pixel circuit SPB−2, and the third pixel circuit SPB−3 arranged along the first direction D1.

In the present embodiment, the second reset control signal line RS_V−2 and the second light-emitting control signal line EM_V−2 are electrically connected to three second reset signal lines RS_H−2 and three second light-emitting signal lines EM_H−2, respectively, and electrically connected to the second plurality of pixel circuits SPR, SPG, SPB via the three second reset signal lines RS_H−2 and the three second light-emitting signal lines EM_H−2. In other words, a second reset control signal line RS_V−2 and a second light-emitting control signal line EM_V−2 are electrically connected to three rows of pixel circuits SPR, three rows of pixel circuits SPG, and/or three rows of pixel circuits SPB. The second plurality of pixel circuits SPR, SPG, SPB form the fourth row R4, the fifth row R5, and the sixth row R6 of pixel structures PX. For example, the second plurality of the pixel circuits SPR, SPG, SPB include a fourth pixel circuit SPB−4, a fifth pixel circuit SPB−5, and a sixth pixel circuit SPB−6 arranged along the first direction D1.

In the present embodiment, every three rows of pixel structures PX share the same reset control signal line and the same light-emitting control signal line. By sharing the reset control signal line and the light-emitting control signal line, the number of signal lines needed may be reduced, thereby increasing the aperture ratio of the pixel array substrate.

Referring to FIG. 8A and FIG. 8B, when driving the pixel array substrate 10B, within a time range of a frame FT, first reset signals RS[1 to 3] are first provided to the first plurality of pixel circuits (that is, the pixel circuits in the first row R1, the second row R2, and the third row R3) using the first reset control signal line RS_V−1.

Next, the plurality of writing signals WR[1], and WR[2], and WR[3] are provided to the first plurality of the pixel circuits sequentially. For example, the writing signal WR[1] is provided to the pixel circuits in the first row R1 via the first writing control signal line, and then the writing signal WR[2] is provided to the pixel circuits in the second row R2 via the second writing control signal line. Lastly, the writing signal WR[3] is provided to the pixel circuits in the third row R3 via the third writing control signal line. When the writing signals WR[1], WR[2], and WR[3] are provided, the data line signal Vdata is provided to the pixel circuits. In some embodiments, the data line signal Vdata may include a red data line signal, a green data line signal, and a blue data line signal, and are provided to a red pixel circuit, a green pixel circuit, and a blue pixel circuit, respectively.

Next, first light-emitting signals EM[1 to 3] are provided to the first plurality of the pixel circuits (that is, the pixel circuits in the first row R1, the second row R2, and the third row R3) using the first light-emitting control signal line EM_V−1.

In some embodiments, the duration of one writing signal is 1H. After a period of time (e.g., time 3H, which is three times the time 1H) after the first reset signals RS[1 to 3] are provided, second reset signals RS[4 to 6] (not shown in FIG. 8B) are provided to the second plurality of the pixel circuits (that is, the pixel circuits in the fourth row R4, the fifth row R5, and the sixth row R6) using the second reset control signal line RS_V−2.

Next, a plurality of writing signals WR[4], and WR[5], and WR[6] (not shown in FIG. 8B) are provided to the second plurality of the pixel circuits sequentially. For example, the writing signal WR[4] is provided to the pixel circuits in the fourth row R4 via the fourth writing control signal line, and then the writing signal WR[5] is provided to the pixel circuits in the fifth row R5 via the fifth writing control signal line. Lastly, the writing signal WR[6] is provided to the pixel circuits in the sixth row R6 via the sixth writing control signal line. When the writing signals WR[4], WR[5], and WR[6] are provided, the data line signal Vdata is provided to the pixel circuits.

Next, second light-emitting signals EM[4 to 6] (not shown in FIG. 8B) are provided to the second plurality of the pixel circuits (that is, the pixel circuits in the fourth row R4, the fifth row R5, and the sixth row R6) using the second light-emitting control signal line EM_V−2.

Similarly, (n/3)th reset signals RS[n−2 to n] are provided to the pixel circuits in the (n−2)th row to the n-th row using the (n/3)th reset control signal line.

Next, a writing signal WR[n−2] is provided to the pixel circuits in the (n−2)th row via the (n−2)th writing control signal line, and then the writing signal WR[n−1] is provided to the pixel circuits in the (n−1)th row via the (n−1)th writing control signal line, and lastly the writing signal WR[n] is provided to the pixel circuits in the n-th row via the n-th writing control signal line. When the writing signals WR[n−2], WR[n−1], and WR[n] are provided, the data line signal Vdata is provided to the pixel circuits.

Next, (n/3)th light-emitting signals EM[n−2 to n] are provided to the pixel circuits in the (n−2)th row to the n-th row using the (n/3)th light-emitting control signal line.

At this point, the operation of the pixel array substrate 10B in one frame FT is completed.

Table 1 provides the number of various signal lines in some pixel array substrates. Table 1 takes the pixel array substrate including an array of 540*240 pixel structures as an example, that is, there are 540 pixel structures PX arranged in the first direction D1 (refer to FIG. 1), and 240 pixel structures PX arranged in the second direction D2. In addition, in the comparative embodiments and the embodiments of Table 1, the signals of the vertical signal lines extended in the first direction D1 are input from a single side, and each gate line (including the reset signal line and the light-emitting signal line) extended in the second direction D2 is connected to a single row of pixel structures.

TABLE 1

| | Comparative embodiment 1 | Embodiment 1 | Embodiment 2 | Embodiment 3 | Embodiment 4 |
|---|---|---|---|---|---|
| Number of reset signal lines connected to a single reset control signal line | 1 | 2 | 3 | 4 | 9 |
| Number of light-emitting signal lines connected to a single light-emitting control signal line | 1 | 2 | 3 | 4 | 9 |
| Total number of reset control signal lines needed | 540 | 270 | 180 | 135 | 60 |
| Total number of light-emitting control signal lines needed | 540 | 270 | 180 | 135 | 60 |
| Total number of writing control signal lines needed | 540 | 540 | 540 | 540 | 540 |
| Vertical signal line allocated to one pixel structure | | | | | |
| Total number of light-emitting control signal lines, reset control signal lines, and writing control signal lines | 6.75->7 | 4.5->5 | 3.75->4 | 3.375->4 | 2.75->3 |
| Number of test voltage signal lines | 1 | 1 | 1 | 1 | 1 |
| Number of vertical reference voltage signal lines | 1 | 1 | 1 | 1 | 1 |
| Number of initial voltage signal lines | 1 | 1 | 1 | 1 | 1 |
| Number of data lines | 3 | 3 | 3 | 3 | 3 |
| Sum | 13 | 11 | 10 | 10 | 9 |
| Horizontal signal line allocated to one pixel structure | | | | | |
| Light-emitting signal line | 1 | 1 | 1 | 1 | 1 |
| Reset signal line | 1 | 1 | 1 | 1 | 1 |
| Scan line | 1 | 1 | 1 | 1 | 1 |
| Number of horizontal reference voltage signal lines | 1 | 1 | 1 | 1 | 1 |
| Sum | 4 | 4 | 4 | 4 | 4 |
| Total number of vertical signal lines and horizontal signal lines allocated to one pixel structure | | | | | |
| | 17 | 15 | 14 | 14 | 13 |

In Table 1, the total number of light-emitting control signal lines, reset control signal lines, and writing control signal lines allocated to one pixel structure is obtained by adding up the total number of reset control signal lines needed, the total number of light-emitting control signal lines needed, and the total number of writing control signal lines needed and dividing by 240. In order to avoid inconsistent pixel spacing due to uneven distribution of signal lines, the obtained value needs to be unconditionally rounded to an integer.

It may be seen from Table 1 that by connecting a single reset control signal line to a plurality of reset signal lines and connecting a single light-emitting control signal line to a plurality of light-emitting signal lines, the total number of signal lines may be significantly reduced, thereby achieving the object of improving aperture ratio.

It should be noted that Table 1 is only used to better illustrate the invention and is not intended to limit the number of vertical signal lines and the number of horizontal signal lines in the pixel array substrate. Specifically, the pixel array substrate may further include other vertical signal lines and horizontal signal lines. For example, the pixel array substrate may further include vertical signal lines and/or horizontal signal lines for transmitting the first operating voltage VSS and the second operating voltage VDD.

In some embodiments, the vertical signal lines 300 shown in FIG. 1 belong to the same conductive layer (e.g., the first conductive layer), and the horizontal signal lines 400 belong to another same conductive layer (e.g., the second conductive layer), and the first operating voltage VSS and the second operating voltage VDD do not belong to the first conductive layer and the second conductive layer.

Figure 9A:
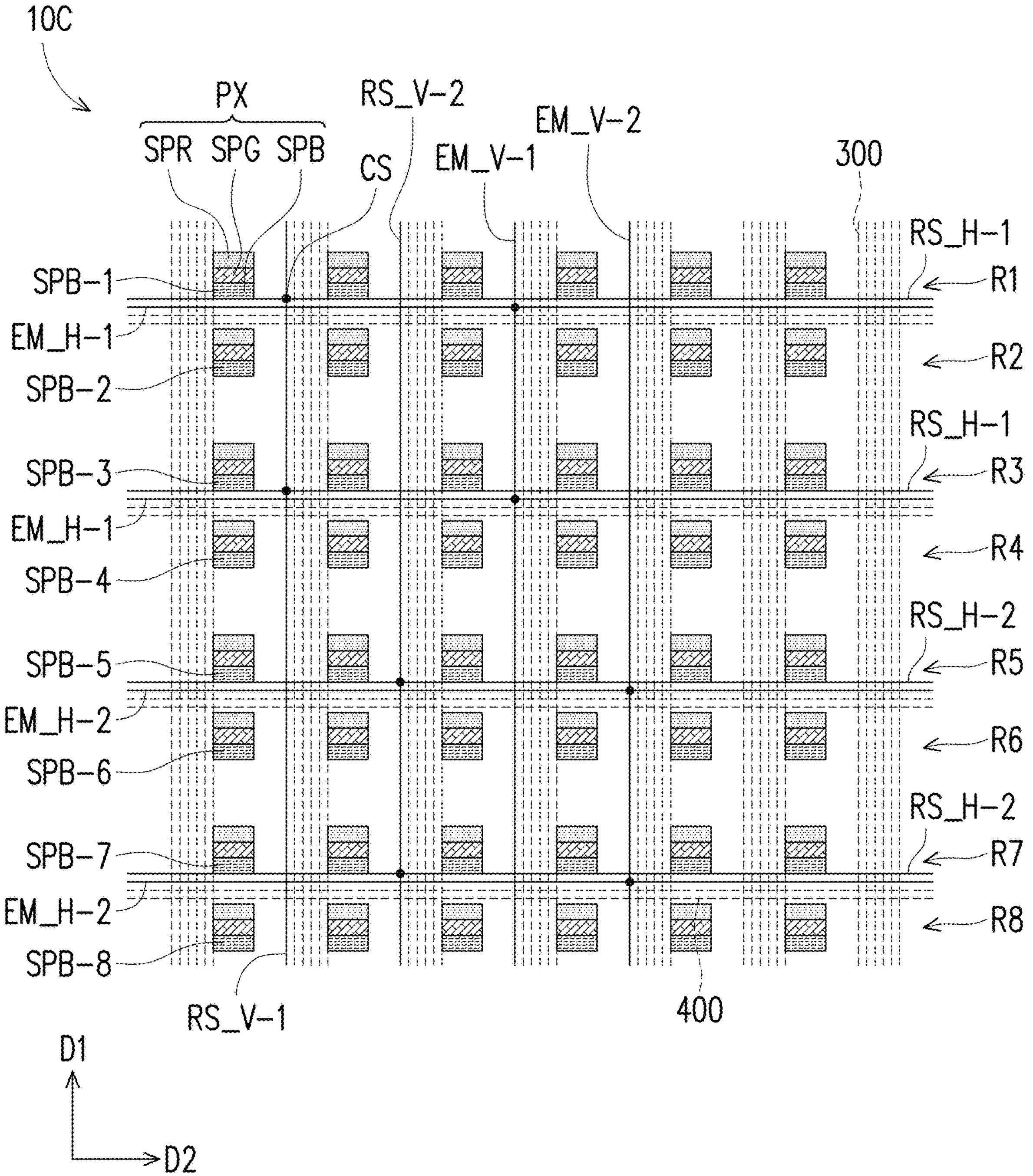
FIG. 9A is a partial top schematic view of a pixel array substrate according to an embodiment of the invention.

FIG. 9A is a partial top schematic view of a pixel array substrate 10C according to an embodiment of the invention.

Figure 9B:
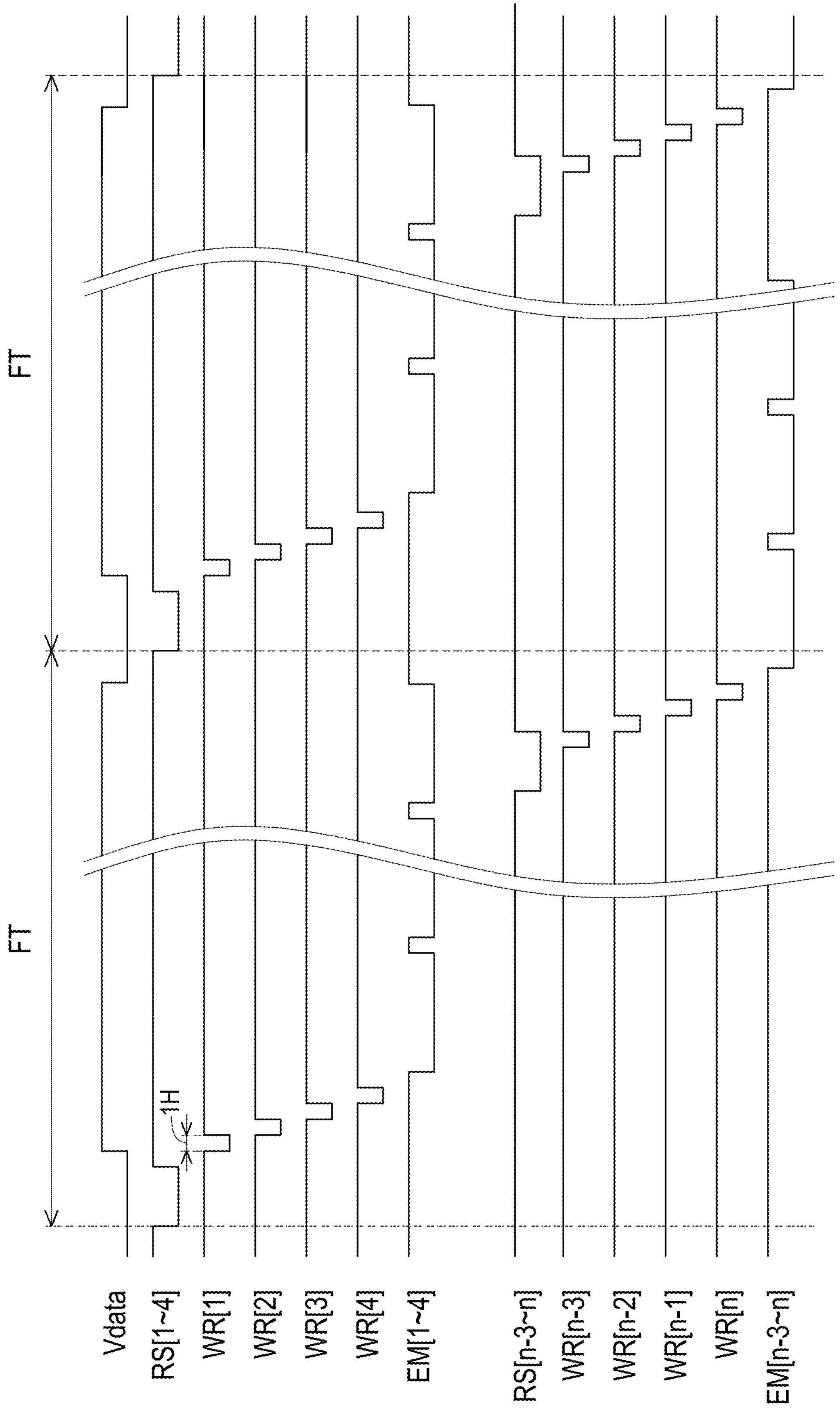
FIG. 9B is a signal timing diagram of the driving method of the pixel array substrate of FIG. 9A.

FIG. 9B is a signal timing diagram of the driving method of the pixel array substrate 10C of FIG. 9A. It should be mentioned here that, the embodiment of FIG. 9A and FIG. 9B adopts the reference numerals of the embodiment of FIG. 8A and FIG. 8B and a portion of the contents thereof, wherein the same or similar numerals are used to represent the same or similar elements and descriptions of the same technical contents are omitted. For descriptions of omitted portions, reference may be made to the above embodiments and are not described again here.

Referring to FIG. 9A, in the present embodiment, two adjacent rows of pixel structures PX share a gate line (e.g., including a reset signal line and a light-emitting signal line) located therebetween. In other words, each of the gate lines is electrically connected to transistors (such as light-emitting control transistors, reset transistors, etc.) in the pixel circuits SPR, SPG, SPB located at two sides thereof.

In the present embodiment, the pixel circuits SPR, SPG, SPB in the pixel structures PX of the first row R1 and the second row R2 share the first reset signal line RS_H−1 and the first light-emitting signal line EM_H−1 located therebetween. The pixel circuits SPR, SPG, SPB in the pixel structures PX of the third row R3 and the fourth row R4 share another first reset signal line RS_H−1 and another first light-emitting signal line EM_H−1 located therebetween. The two first reset signal lines RS_H−1 are electrically connected to the same first reset control signal line RS_V−1, and the two first light-emitting signal lines EM_H−1 are electrically connected to the same first light-emitting control signal line EM_V−1. The pixel structures PX of the first row R1, the second row R2, the third row R3, and the fourth row R4 are respectively electrically connected to the first to fourth scan lines (not shown separately), and the first to fourth scan lines are respectively electrically connected to the first to fourth writing control signal lines (not shown separately).

In the present embodiment, the pixel circuits SPR, SPG, SPB in the pixel structures PX of the fifth row R5 and the sixth row R6 share the second reset signal line RS_H−2 and the second light-emitting signal line EM_H−2 located therebetween. The pixel circuits SPR, SPG, SPB in the pixel structures PX of a seventh row R7 and an eighth row R8 share another second reset signal line RS_H−2 and another second light-emitting signal line EM_H−2 located therebetween. The two second reset signal lines RS_H−2 are electrically connected to the same second reset control signal line RS_V−2, and the two second light-emitting signal lines EM_H−2 are electrically connected to the same second light-emitting control signal line EM_V−2. The pixel structures PX of the fifth row R5, the sixth row R6, the seventh row R7, and the eighth row R8 are respectively electrically connected to the fifth to eighth scan lines (not shown separately), and the fifth to eighth scan lines are respectively electrically connected to the fifth to eighth writing control signal lines (not shown separately).

In the present embodiment, every four rows of pixel structures PX share the same reset control signal line and the same light-emitting control signal line. By sharing the reset control signal line and the light-emitting control signal line, the number of signal lines needed may be reduced, thereby increasing the aperture ratio of the pixel array substrate.

Referring to FIG. 9A and FIG. 9B, when driving the pixel array substrate 10C, within a time range of a frame FT, the first reset control signal line RS_V−1 is first used to provide first reset signals RS[1 to 4] to the first plurality of pixel circuits (that is, the pixel circuits in the first row R1 to the fourth row R4).

Next, the plurality of writing signals WR[1], WR[2], WR[3], and WR[4] are provided to the first plurality of the pixel circuits sequentially. For example, the writing signals WR[1], WR[2], WR[3], and WR[4] are sequentially provided to the pixel circuits in the first row R1 to the fourth row R4 via the first to fourth writing control signal lines. When the writing signals WR[1], WR[2], WR[3], and WR[4] are provided, the data line signal Vdata is provided to the pixel circuits. In some embodiments, the data line signal Vdata may include a red data line signal, a green data line signal, and a blue data line signal, and are provided to a red pixel circuit, a green pixel circuit, and a blue pixel circuit, respectively.

Next, first light-emitting signals EM[1 to 4] are provided to the first plurality of the pixel circuits (that is, the pixel circuits in the first row R1 to the fourth row R4) using the first light-emitting control signal line EM_V−1.

In some embodiments, the duration of one writing signal is 1H. After a period of time (e.g., time 4H, which is four times the time 1H) after the first reset signals RS[1 to 4] are provided, second reset signals RS[5 to 8] (not shown in FIG. 9B) are provided to the second plurality of the pixel circuits (that is, the pixel circuits in the fifth row R5 to the eighth row R8) using the second reset control signal line RS_V−2.

Next, a plurality of writing signals WR[5], WR[6], WR[7], WR[8] (not shown in FIG. 9B) are provided to the second plurality of the pixel circuits sequentially. For example, the writing signals WR[5], WR[6], WR[7], and WR[8] are sequentially provided to the pixel circuits in the fifth row R5 to the eighth row R8 via the fifth to eighth writing control signal lines. When the writing signals WR[5], WR[6], WR[7], and WR[8] are provided, the data line signal Vdata is provided to the pixel circuits.

Next, second light-emitting signals EM[5 to 8] (not shown in FIG. 9B) are provided to the second plurality of the pixel circuits (that is, the pixel circuits in the fifth row R5 to the eighth row R8) using the second light-emitting control signal line EM_V−2.

Similarly, (n/4)th reset signals RS[n−3 to n] are provided to the pixel circuits in the (n−3)th row to the n-th row using the (n/4)th reset control signal line.

Next, writing signals WR[n−3], WR[n−2], WR[n−1], WR[n] are sequentially provided to the pixel circuits in the (n−3)th to n-th rows via the (n−3)th to n-th writing control signal lines. When the writing signals WR[n−3], WR[n−2], WR[n−1], WR[n] are provided, the data line signal Vdata is provided to the pixel circuits.

Next, (n/4)th light-emitting signals EM[n−3 to n] are provided to the pixel circuits in the (n−3)th row to the n-th row using the (n/4)th light-emitting control signal line.

At this point, the operation of the pixel array substrate 10C in one frame FT is completed.

Table 2 provides the numbers of various signal lines in the pixel array substrate 10C of FIG. 9A and FIG. 9B. Table 2 takes the pixel array substrate 10C including an array of 540*240 pixel structures as an example, that is, there are 540 pixel structures PX arranged in the first direction D1, and 240 pixel structures PX arranged in the second direction D2.

TABLE 2

| | |
|---|---|
| Number of reset signal lines connected to a single reset control signal line | 2 |
| Number of light-emitting signal lines connected to a single light-emitting control | 2 |

TABLE 2-continued

| | |
|---|---|
| signal line | |
| Total number of reset control signal lines needed | 135 |
| Total number of light-emitting control signal lines needed | 135 |
| Total number of writing control signal lines needed | 540 |
| Vertical signal line allocated to one pixel structure | |
| Total number of light-emitting control signal lines, reset control signal lines, and writing control signal lines | 3.375->4 |
| Number of test voltage signal lines | 1 |
| Number of vertical reference voltage signal lines | 1 |
| Number of initial voltage signal lines | 1 |
| Number of data lines | 3 |
| Sum | 10 |
| Horizontal signal line allocated to one pixel structure | |
| Light-emitting signal line | 0.5 |
| Reset signal line | 0.5 |
| Scan line | 1 |
| Number of horizontal reference voltage signal lines | 0.5 |
| Sum | 2.5 |
| Total number of vertical signal lines and horizontal signal lines allocated to one pixel structure | |
| | 12.5 |

In Table 2, the total number of light-emitting control signal lines, reset control signal lines, and writing control signal lines allocated to one pixel structure is obtained by adding up the total number of reset control signal lines needed, the total number of light-emitting control signal lines needed, and the total number of writing control signal lines needed and dividing by 240. In order to avoid inconsistent pixel spacing in the second direction D2 due to uneven distribution of signal lines, the obtained value needs to be unconditionally rounded to an integer.

It may be seen from Table 2 that by connecting a single reset control signal line to a plurality of reset signal lines and connecting a single light-emitting control signal line to a plurality of light-emitting signal lines, the total number of signal lines may be significantly reduced, thereby achieving the object of improving aperture ratio.

It should be noted that Table 2 is only used to better illustrate the invention and is not intended to limit the number of vertical signal lines and the number of horizontal signal lines in the pixel array substrate. Specifically, the pixel array substrate may further include other vertical signal lines and horizontal signal lines. For example, the pixel array substrate may further include vertical signal lines and/or horizontal signal lines for transmitting the first operating voltage VSS and the second operating voltage VDD.

Figure 10:
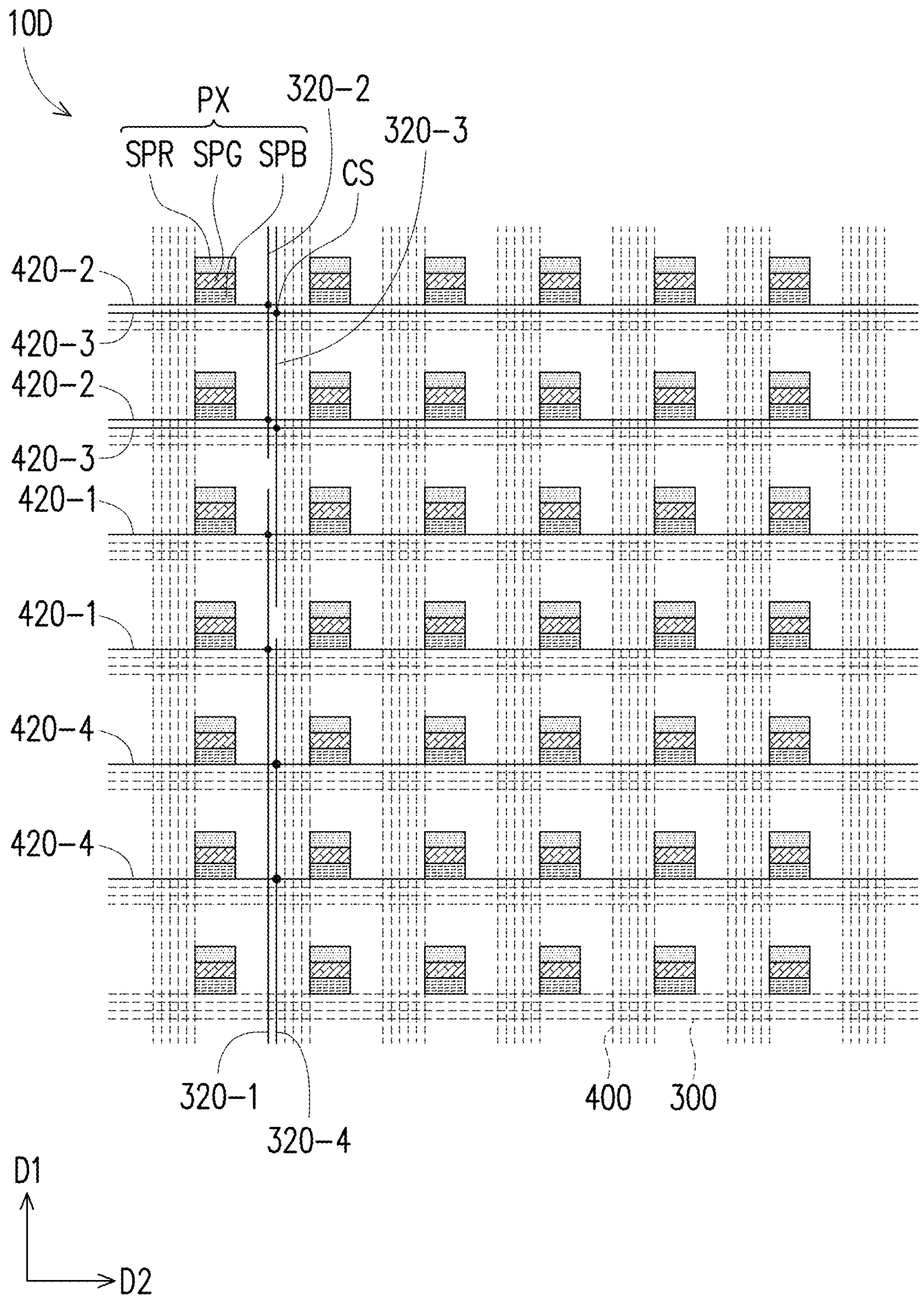
FIG. 10 is a partial top schematic view of a pixel array substrate according to an embodiment of the invention.

FIG. 10 is a partial top schematic view of a pixel array substrate 10D according to an embodiment of the invention. It should be mentioned here that, the embodiment of FIG. 10 adopts the reference numerals of the embodiment of FIG. 9A and FIG. 9B and a portion of the contents thereof, wherein the same or similar numerals are used to represent the same or similar elements and descriptions of the same technical contents are omitted. For descriptions of omitted portions, reference may be made to the above embodiments and are not described again here.

Referring to FIG. 10, in the present embodiment, the circuit board is disposed at the upper and lower sides of the display panel, so that the vertical signal lines 300 may receive signals from the upper and lower sides. Therefore, the two longitudinal signal lines 300 may be arranged in the first direction D1 and separated from each other, and are electrically connected to the circuit boards located at the upper and lower sides respectively.

For example, two second transmission lines 320-1 and 320-2 are arranged in the first direction D1 and spaced apart from each other, and another two second transmission lines 320-3 and 320-4 are arranged in the first direction D1 and spaced apart from each other. Each of the second transmission lines 320-1, 320-2, 320-3, and 320-4 may be a gate signal line or a writing control signal line, and the gate signal line is, for example, a reset control signal line or a light-emitting control signal line.

The second transmission lines 320-1, 320-2, 320-3, 320-4 are electrically connected to two first signal output lines 420-1, two second signal output lines 420-2, two third signal output lines 420-3, and two fourth signal output lines 420-4, respectively. Each of the first signal output lines 420-1, the second signal output lines 420-2, the third signal output lines 420-3, and the fourth signal output lines 420-4 may be a gate line or a scan line, and the gate line is, for example, a reset signal line or a light-emitting signal line.

Table 3 provides the number of various signal lines in the pixel array substrate 10D of FIG. 10. Table 3 takes the pixel array substrate 10D including an array of 540*240 pixel structures as an example, that is, there are 540 pixel structures PX arranged in the first direction D1, and 240 pixel structures PX arranged in the second direction D2.

TABLE 3

| | |
|---|---|
| Number of reset signal lines connected to a single reset control signal line | 2 |
| Number of light-emitting signal lines connected to a single light-emitting control signal line | 2 |
| Total number of reset control signal lines needed | 270 |
| Total number of light-emitting control signal lines needed | 270 |
| Total number of writing control signal lines needed | 540 |
| Vertical signal line allocated to one pixel structure | |
| Total number of light-emitting control signal lines, reset control signal lines, and writing control signal lines | 2.25->3 |
| Number of test voltage signal lines | 1 |
| Number of vertical reference voltage signal lines | 1 |
| Number of initial voltage signal lines | 1 |
| Number of data lines | 3 |
| Sum | 9 |
| Horizontal signal line allocated to one pixel structure | |
| Light-emitting signal line | 1 |
| Reset signal line | 1 |
| Scan line | 1 |
| Number of horizontal reference voltage signal lines | 1 |
| Sum | 4 |
| Total number of vertical signal lines and horizontal signal lines allocated to one pixel structure | |
| | 13 |

In Table 3, the total number of light-emitting control signal lines, reset control signal lines, and writing control signal lines allocated to one pixel structure is obtained by summing up the total number of reset control signal lines needed, the total number of light-emitting control signal lines needed, and the total number of writing control signal lines needed, and then first dividing by 2 (since the signal may be input from the top and bottom, so that there may be two separated signal lines in the first direction D1), and then dividing by 240. In order to avoid inconsistent pixel spacing due to uneven distribution of signal lines, the obtained value needs to be unconditionally rounded to an integer.

It may be seen from Table 3 that by connecting a single reset control signal line to a plurality of reset signal lines and connecting a single light-emitting control signal line to a plurality of light-emitting signal lines, the total number of signal lines may be significantly reduced, thereby achieving the object of improving aperture ratio.

It should be noted that Table 3 is only used to better illustrate the invention and is not intended to limit the number of vertical signal lines and the number of horizontal signal lines in the pixel array substrate. Specifically, the pixel array substrate may further include other vertical signal lines and horizontal signal lines. For example, the pixel array substrate may further include vertical signal lines and/or horizontal signal lines for transmitting the first operating voltage VSS and the second operating voltage VDD.

What is claimed is:

1. A pixel array substrate, comprising:

a plurality of pixel circuits, each of the pixel circuits comprising:

a reset circuit;

a writing circuit electrically connected to the reset circuit;

a light-emitting control circuit electrically connected to the writing circuit, wherein the light-emitting control circuit comprises a light-emitting control transistor, a driving element, and a capacitor, the light-emitting control transistor is electrically connected the capacitor and the driving element; and a light-emitting diode electrically connected to the light-emitting control circuit, wherein the light-emitting diode is electrically connected to the driving element via the light-emitting control transistor:

a plurality of data lines extended along a first direction and electrically connected to the pixel circuits;

a plurality of scan lines extended alone a second direction and electrically connected to the pixel circuits, wherein the second direction is not parallel to the first direction;

a first reset control signal line extended along the first direction and electrically connected to the reset circuits of a first plurality of the pixel circuits, wherein the first plurality of the pixel circuits are arranged in two or more rows along the first direction;

a first light-emitting control signal line extended along the first direction and electrically connected to the light-emitting control circuits of the first plurality of the pixel circuits;

a first writing control signal line extended along the first direction and electrically connected to a first row of the first plurality of the pixel circuits:

two or more reset signal lines extended along the second direction, wherein the first reset control signal line is electrically connected to the first plurality of the pixel circuits via the two or more reset signal lines; and two or more light-emitting signal lines extended along the second direction, wherein the first light-emitting control signal line is electrically connected to the first plurality of the pixel circuits via the two or more light-emitting signal lines, wherein light-emitting control transistors of two adjacent pixel circuits in same row are electrically connected to the first light-emitting control signal line and same light-emitting signal line, wherein the reset circuits of the two adjacent pixel circuits in the same row are electrically connected to the first reset control signal line and same reset signal line, and wherein the writing circuits of the two adjacent pixel circuits in the same row are electrically connected to the first writing control signal line and same scan line.

2. The pixel array substrate of claim 1, wherein the reset circuit of each of the first plurality of the pixel circuits comprises:

a first reset transistor, a second reset transistor, and a third reset transistor electrically connected to the first reset control signal line; wherein the writing circuit of each of the first plurality of the pixel circuits comprises:

a switch element, a first writing transistor, and a second writing transistor, wherein the first writing transistor is connected between the second writing transistor and the switch element, wherein the first writing transistor is electrically connected to the first light-emitting control signal line, and the switch element is electrically connected to a corresponding one of the data lines; wherein the light-emitting control transistor is electrically connected to the first light-emitting control signal line, the light-emitting diode, the capacitor, the third reset transistor, and the driving element, wherein one end of the capacitor is electrically connected to the switch element, the first reset transistor, and the first writing transistor, and another end of the capacitor is electrically connected to the light-emitting control transistor, the third reset transistor, and the driving element, and the driving element is electrically connected to the second reset transistor, the second writing transistor, and the first writing transistor.

3. The pixel array substrate of claim 1, further comprising:

a second writing control signal line extended along the first direction and electrically connected to a second row of the first plurality of the pixel circuits.

4. The pixel array substrate of claim 1, wherein each of the pixel circuits further comprises a test circuit.

5. A driving method of a pixel array substrate, comprising:

providing the pixel array substrate of claim 1, wherein the pixel array substrate further comprises:

a second reset control signal line extended along the first direction and electrically connected to the reset circuits of a second plurality of the pixel circuits, wherein the second plurality of the pixel circuits are arranged in other two or more rows along the first direction; and a second light-emitting control signal line extended along the first direction and electrically connected to the light-emitting control circuits of the second plurality of the pixel circuits;

providing a first reset signal to the first plurality of the pixel circuits using the first reset control signal line;

providing a plurality of writing signals to the first plurality of the pixel circuits sequentially;

providing a first light-emitting signal to the first plurality of the pixel circuits using the first light-emitting control signal line;

providing a second reset signal to the second plurality of the pixel circuits using the second reset control signal line;

providing another plurality of writing signals to the second plurality of the pixel circuits sequentially; and providing a second light-emitting signal to the second plurality of the pixel circuits using the second light-emitting control signal line.

6. The driving method of claim 5, wherein the first plurality of the pixel circuits comprise a first pixel circuit and a second pixel circuit arranged along the first direction, and the second plurality of the pixel circuits comprise a third pixel circuit and a fourth pixel circuit arranged along the first direction.

7. The driving method of claim 5, wherein the first plurality of the pixel circuits comprise a first pixel circuit, a second pixel circuit, and a third pixel circuit arranged along the first direction, and the second plurality of the pixel circuits comprise a fourth pixel circuit, a fifth pixel circuit, and a sixth pixel circuit arranged along the first direction.

8. A pixel array substrate, comprising:

a plurality of pixel circuits, each of the pixel circuits comprising:

a switch element;

a driving element, electrically connected to the switch element;

a light-emitting control transistor;

a capacitor, wherein the light-emitting control transistor is electrically connected the capacitor and the driving element; and a light-emitting diode electrically connected to the driving element via the light-emitting control transistor;

a plurality of data lines extended along a first direction and electrically connected to the switch elements of the pixel circuits;

a plurality of scan lines extended along a second direction and electrically connected to the switch elements of the pixel circuits, wherein the second direction is not parallel to the first direction;

a first light-emitting control signal line extended along the first direction and electrically connected to a first plurality of the pixel circuits; and two or more light-emitting signal lines extended along the second direction, wherein the first light-emitting control signal line is electrically connected to the light-emitting control transistors of the first plurality of the pixel circuits via the two or more light-emitting signal lines, and light-emitting control transistors of two adjacent pixel circuits in same row are electrically connected to the first light-emitting control signal line and same light-emitting signal line.

9. The pixel array substrate of claim 8, wherein each of the pixel circuits further comprises a first reset transistor, a second reset transistor, and a third reset transistor, and the pixel array substrate further comprises a first reset control signal line, wherein the first reset transistor, the second reset transistor, and the third reset transistor of each of the first plurality of the pixel circuits are electrically connected to the first reset control signal line.

10. The pixel array substrate of claim 9, wherein each of the pixel circuits further comprises a first writing transistor and a second writing transistor, the first writing transistor is connected between the second writing transistor and the switch element, and the first writing transistor of each of the first plurality of the pixel circoits is electrically connected to the first light-emitting control signal line.

11. The pixel array substrate of claim 10, wherein the light-emitting control transistor is electrically connected to the third reset transistor and the driving element.

12. The pixel array substrate of claim 10, wherein one end of the capacitor is electrically connected to the switch element, the first reset transistor, and the first writing transistor, and another end of the capacitor is electrically connected to the light-emitting control transistor, the third reset transistor, and the driving element.

13. A pixel array substrate, comprising:

a plurality of pixel circuits arranged in rows including at least a first row and a second row, each of the pixel circuits comprising:

a reset circuit;

a writing circuit electrically connected to the reset circuit;

a light-emitting control circuit electrically connected to the writing circuit, wherein the light-emitting control circuit comprises a light-emitting control transistor, a driving element, and a capacitor, the light-emitting control transistor is electrically connected the capacitor and the driving element; and a light-emitting diode electrically connected to the light-emitting control circuit, wherein the light-emitting diode is electrically connected to the driving element via the light-emitting control transistor;

a plurality of data lines extended along a first direction and electrically connected to the pixel circuits, wherein the pixel circuits in the first row are arranged along a second direction, the pixel circuits in the second row are arranged along the second direction, and the second direction is not parallel to the first direction;

a first reset control signal line extended along the first direction and electrically connected to the reset circuits of a first plurality of the pixel circuits in the first row and the pixel circuits in the second row, wherein the first plurality of the pixel circuits are arranged in two or more rows along the first direction;

a first light-emitting control signal line extended along the first direction and electrically connected to the light-emitting control circuits of the first plurality of the pixel circuits in the first row and the pixel circuits in the second row;

a first light-emitting signal line extended along the second direction, wherein the first light-emitting signal line electrically connects the first light-emitting control signal line to the light-emitting control transistors of the pixel circuits in the first row; and a second light-emitting signal line extended along the second direction, wherein the second light-emitting signal line electrically connects the first light-emitting control signal line to the light-emitting control transistors of the pixel circuits in the second row.

14. A pixel array substrate, comprising:

a plurality of pixel circuits arranged in rows including at least a first row and a second row, each of the pixel circuits comprising:

a switch element;

a driving element, electrically connected to the switch element;

a light-emitting control transistor;

a capacitor, wherein the light-emitting control transistor is electrically connected the capacitor and the driving element; and a light-emitting diode electrically connected to the driving element via the light-emitting control transistor;

a plurality of data lines extended along a first direction and electrically connected to the switch elements;

a plurality of scan lines extended along a second direction and electrically connected to the switch elements, wherein the pixel circuits in the first row are arranged along a second direction, the pixel circuits in the second row are arranged along the second direction, and the second direction is not parallel to the first direction;

a first light-emitting control signal line extended along the first direction;

a first light-emitting signal line extended along the second direction, wherein the first light-emitting signal line electrically connects the first light-emitting control signal line to the light-emitting control transistors of the pixel circuits in the first row; and a second light-emitting signal line extended along the second direction, wherein the second light-emitting signal line electrically connects the first light-emitting control signal line to the light-emitting control transistors of the pixel circuits in the second row.

* * * * *